United States Patent
Masanamuthu Chinnathurai et al.

(10) Patent No.: US 12,175,247 B2
(45) Date of Patent: Dec. 24, 2024

(54) APPARATUSES, METHODS, AND SYSTEMS FOR INSTRUCTIONS FOR A HARDWARE ASSISTED HETEROGENEOUS INSTRUCTION SET ARCHITECTURE DISPATCHER

(71) Applicant: Intel Corporation, Santa Clara, CA (US)

(72) Inventors: Balaji Masanamuthu Chinnathurai, Hillsboro, OR (US); Kunal Mehta, Hillsboro, OR (US); Brian L. Vajda, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 17/359,306

(22) Filed: Jun. 25, 2021

(65) Prior Publication Data
US 2022/0413865 A1 Dec. 29, 2022

(51) Int. Cl.
*G06F 9/30* (2018.01)

(52) U.S. Cl.
CPC ...... *G06F 9/30196* (2013.01); *G06F 9/30098* (2013.01); *G06F 9/30145* (2013.01); *G06F 9/30189* (2013.01)

(58) Field of Classification Search
CPC ............. G06F 9/30196; G06F 9/30098; G06F 9/30145; G06F 9/30189
See application file for complete search history.

(56) References Cited

U.S. PATENT DOCUMENTS 5,854,913 A * 12/1998 Goetz ................. G06F 12/1054
712/210
6,021,484 A * 2/2000 Park .................... G06F 9/30174
712/23

(Continued)

*Primary Examiner* — Corey S Faherty
(74) *Attorney, Agent, or Firm* — NICHOLSON DE VOS WEBSTER & ELLIOTT LLP

(57) ABSTRACT

Systems, methods, and apparatuses to support instructions for a hardware assisted heterogeneous instruction set architecture dispatcher are described. In one embodiment, a hardware processor includes a plurality of processor cores comprising a first type of processor core that supports a first instruction set architecture and a second type of processor core that supports a second different instruction set architecture, a decoder circuit of a processor core of the plurality of processor cores to decode a single instruction into a decoded single instruction, the single instruction including a field that identifies a requested core type and an opcode that indicates an execution circuit of the processor core is to: read a register to determine a core type of the processor core, cause the processor core to enter a first mode, that only permits execution of the first instruction set architecture by the processor core, when the requested core type and the core type of the processor core are the first type, cause the processor core to enter a second mode, that only permits execution of the second different instruction set architecture by the processor core, when the requested core type and the core type of the processor core are the second type, cause the processor core to enter a third mode, that only permits execution of the first instruction set architecture by the processor core, when the requested core type is the second type and the core type of the processor core is the first type, and cause the processor core to enter a fourth mode, that only permits execution of the second different instruction set architecture by the processor core, when the requested core type is the first type and the core type of the processor core (Continued)

Example HIDENTER State Transition Outcomes 900

| Requested Core Type (e.g., RBX value) | Core type of processor core executing HIDENTER | Result |
|---|---|---|
| 20H (First Type) | 20H (First Type) | Enters H-ISA state (e.g., and sets ZF to 1). Reading MSR IA32_HID_STATUS.BIT0 will return 1. Software can now execute (e.g., first type only) heterogeneous instructions. If software flow is interrupted before it executes HIDEXIT, it will be rescheduled only on processor cores of first core type (20H). |
| | 40H (Second Type) | Does not enter H-ISA state (e.g., and resets ZF to 0). Reading MSR IA32_HID_STATUS.BIT0 will return 0. |
| 40H (Second Type) | 20H (First Type) | Does not enter H-ISA state (e.g., and resets ZF to 0). Reading MSR IA32_HID_STATUS.BIT0 will return 0. |
| | 40H (Second Type) | Enters H-ISA state (e.g., and sets ZF to 1). Reading MSR IA32_HID_STATUS.BIT0 will return 1. Software can now execute (e.g., second type only) heterogeneous instructions. If software flow is interrupted before it executes HIDEXIT, it will be rescheduled only on processor cores of second core type (40H). | is the second type, and the execution circuit of the processor core to execute the decoded single instruction according to the opcode.

24 Claims, 36 Drawing Sheets

(56) References Cited

U.S. PATENT DOCUMENTS

| | | | | |
|---|---|---|---|---|
| 7,149,878 | B1 * | 12/2006 | Jensen | G06F 9/30196 |
| | | | | 712/E9.055 |
| 8,806,182 | B2 * | 8/2014 | Rymarczyk | G06F 9/3885 |
| | | | | 712/229 |
| 9,753,730 | B2 * | 9/2017 | Craske | G06F 9/30145 |
| 10,007,520 | B1 * | 6/2018 | Ross | G06F 9/30174 |

* cited by examiner

Example Instructions and Exception 400

| Instruction / Exception | Description |
|---|---|
| HIDCPUID | Detect heterogeneous ISA features on the core (e.g., logical core or CPU). |
| HIDENTER | Enter H-ISA execution mode. |
| HIDENTERMIGRATE | Enter H-ISA execution mode with intent to migrate to a more performant core if available. |
| HIDEXIT | Exit H-ISA execution mode. |
| H-ISA Exception | Raises exception to migrate software to a different core type. |

FIG. 4

Example Registers 500

| MSR | Description |
|---|---|
| IA32_HID_CTRL_MSR | H-ISA state enable |
| | H-ISA migration enable |
| IA32_HID_STATUS_MSR | Returns the current execution state. |

FIG. 5

Example HIDCPUID Instruction Format 600

| Opcode | Instruction | Description |
|---|---|---|
| (VALUE) | HIDCPUID | Returns heterogeneous feature information to EAX, EBX, ECX and EDX registers, as determined by input entered in EAX, EBX, and/or ECX. |

FIG. 6

| Core Type Identifiers 700 ||
|---|---|
| Initial EBX Value | Core Type Identifier |
| 20H | Intel® Atom® Microarchitecture |
| 40H | Intel® Core™ Microarchitecture |

FIG. 7

Example HIDENTER Instruction Format 800

| Opcode | Instruction | Description |
|---|---|---|
| (Value) | HIDENTER | Enters Heterogeneous ISA (H-ISA) state (e.g., mode) for the core type identifier input specified in RBX register. |

FIG. 8

Example HIDENTER State Transition Outcomes 900

| Requested Core Type (e.g., RBX value) | Core type of processor core executing HIDENTER | Result |
|---|---|---|
| 20H (First Type) | 20H (First Type) | Enters H-ISA state (e.g., and sets ZF to 1). Reading MSR IA32_HID_STATUS.BIT0 will return 1. Software can now execute (e.g., first type only) heterogeneous instructions. If software flow is interrupted before it executes HIDEXIT, it will be rescheduled only on processor cores of first core type (20H). |
| | 40H (Second Type) | Does not enter H-ISA state (e.g., and resets ZF to 0). Reading MSR IA32_HID_STATUS.BIT0 will return 0. |
| 40H (Second Type) | 20H (First Type) | Does not enter H-ISA state (e.g., and resets ZF to 0). Reading MSR IA32_HID_STATUS.BIT0 will return 0. |
| | 40H (Second Type) | Enters H-ISA state (e.g., and sets ZF to 1). Reading MSR IA32_HID_STATUS.BIT0 will return 1. Software can now execute (e.g., second type only) heterogeneous instructions. If software flow is interrupted before it executes HIDEXIT, it will be rescheduled only on processor cores of second core type (40H). |

FIG. 9

Example Failure Reasons for HIDENTER (e.g., returned in RBX) 1000

| Bit Position | Comment |
|---|---|
| 0 | H-ISA not enabled |
| 1 | Currently executing processor core does not match core type identifier requested by software (e.g., in RBX) |
| 63:2 | Reserved |

FIG. 10

Example HIDENTERMIGRATE Instruction Format 1100

| Opcode | Instruction | Description |
|---|---|---|
| (Value) | HIDENTERMIGRATE | Enters Heterogeneous ISA (H-ISA) state for the core type identifier input specified in a (e.g., RBX) register with an intent to migrate to a different (e.g., more performant) core. |

FIG. 11

Example HIDENTERMIGRATE State Transition Outcomes 1200

| Requested Core Type (RBX value) | Core type of processor core executing HIDENTERMIGRATE | Result |
|---|---|---|
| 20H (First Type) | 20H (First Type) | Enters H-ISA state (e.g., and sets ZF to 1). Reading MSR IA32_HID_STATUS.BIT0 will return 1. Software can now execute (e.g., first type only) heterogeneous instructions. If software flow is interrupted before it executes HIDEXIT, it will be rescheduled only on processor cores of first core type (20H. |
| 20H (First Type) | 40H (Second Type) | Raises H-ISA exception with "Migrate" exception reason. E.g., the operating system is to reschedule the thread to a processor core of first core type (20H). |
| 40H (Second Type) | 20H (First Type) | Raises H-ISA exception with "Migrate" exception reason. E.g., the operating system is to reschedule the thread to a processor core of second core type (40H). |
| 40H (Second Type) | 40H (Second Type) | Enters H-ISA state (e.g., and sets ZF to 1). Reading MSR IA32_HID_STATUS.BIT0 will return 1. Software can now execute heterogeneous instructions. If software flow is interrupted before it executes HIDEXIT, it will be rescheduled only on processor cores of second core type (40H). |

FIG. 12

Example Failure Reasons for HIDENTERMIGRATE (e.g., returned in RBX) 1300

| Bit Position | Comment |
|---|---|
| 0 | H-ISA not enabled |
| 1 | Currently executing processor core type does not match core type identifier requested by software (e.g., in RBX) |
| 2 | H-ISA migration not enabled |
| 63:3 | Reserved |

FIG. 13

Example HIDEXIT Instruction Format 1400

| Opcode | Instruction | Description |
|---|---|---|
| (Value) | HIDEXIT | Exits from H-ISA state. |

FIG. 14

Example STATUS MSR Format 1500

| Register Address (Value) | Architectural MSR Name and Bit Fields | Description |
|---|---|---|
| | IA32_HID_STATUS_MSR | |
| | 0 | 0 – H-ISA state not active<br>1 – H-ISA state active |
| | 7:1 | Reserved |
| | 15:8 | Mask representing core type where the current SW thread can be rescheduled if it is interrupted when H-ISA state is active |
| | 63:16 | Reserved |

FIG. 15

Example CONTROL MSR Format 1600

| Register Address | Architectural MSR Name and Bit Fields | Description |
|---|---|---|
| TBD | IA32_HID_CTRL_MSR | |
| | 0 | H-ISA enable |
| | 1 | H-ISA migration enable |
| | 63:2 | Reserved |

FIG. 16

Example Heterogeneous ISA Exception Format 1700

| Vector | Mnemonic | Description | Type |
|---|---|---|---|
| 22 | #HE | Heterogeneous ISA Exception | Fault |

```
┌─────────────────────────────────────────────────────────────────────┐
│  DECODING, BY A DECODER CIRCUIT OF A PROCESSOR CORE OF A PLURALITY OF │
│   PROCESSOR CORES COMPRISING A FIRST TYPE OF PROCESSOR CORE THAT     │
│   SUPPORTS A FIRST INSTRUCTION SET ARCHITECTURE AND A SECOND TYPE OF │
│   PROCESSOR CORE THAT SUPPORTS A SECOND DIFFERENT INSTRUCTION SET    │
│  ARCHITECTURE, A SINGLE INSTRUCTION INTO A DECODED SINGLE INSTRUCTION, THE │
│  SINGLE INSTRUCTION INCLUDING A FIELD THAT IDENTIFIES A REQUESTED CORE TYPE │
│   AND AN OPCODE THAT INDICATES AN EXECUTION CIRCUIT OF THE PROCESSOR CORE │
│                                 IS TO:                               │
│       READ A REGISTER TO DETERMINE A CORE TYPE OF THE PROCESSOR CORE,│
│        CAUSE THE PROCESSOR CORE TO ENTER A FIRST MODE, THAT ONLY PERMITS │
│    EXECUTION OF THE FIRST INSTRUCTION SET ARCHITECTURE BY THE PROCESSOR │
│    CORE, WHEN THE REQUESTED CORE TYPE AND THE CORE TYPE OF THE PROCESSOR │
│                          CORE ARE THE FIRST TYPE,                    │
│      CAUSE THE PROCESSOR CORE TO ENTER A SECOND MODE, THAT ONLY PERMITS │
│   EXECUTION OF THE SECOND DIFFERENT INSTRUCTION SET ARCHITECTURE BY THE │
│   PROCESSOR CORE, WHEN THE REQUESTED CORE TYPE AND THE CORE TYPE OF THE │
│                     PROCESSOR CORE ARE THE SECOND TYPE,              │
│      CAUSE THE PROCESSOR CORE TO ENTER A THIRD MODE, THAT ONLY PERMITS │
│    EXECUTION OF THE FIRST INSTRUCTION SET ARCHITECTURE BY THE PROCESSOR │
│   CORE, WHEN THE REQUESTED CORE TYPE IS THE SECOND TYPE AND THE CORE TYPE │
│                     OF THE PROCESSOR CORE IS THE FIRST TYPE, AND     │
│     CAUSE THE PROCESSOR CORE TO ENTER A FOURTH MODE, THAT ONLY PERMITS │
│   EXECUTION OF THE SECOND DIFFERENT INSTRUCTION SET ARCHITECTURE BY THE │
│   PROCESSOR CORE, WHEN THE REQUESTED CORE TYPE IS THE FIRST TYPE AND THE │
│              CORE TYPE OF THE PROCESSOR CORE IS THE SECOND TYPE      │
│                                  2302                                │
└─────────────────────────────────────────────────────────────────────┘
                                    │
                                    ▼
┌─────────────────────────────────────────────────────────────────────┐
│  EXECUTING THE DECODED SINGLE INSTRUCTION BY THE EXECUTION CIRCUIT OF THE │
│            PROCESSOR CORE ACCORDING TO THE OPCODE                    │
│                              2304                                    │
└─────────────────────────────────────────────────────────────────────┘
```

FIG. 23

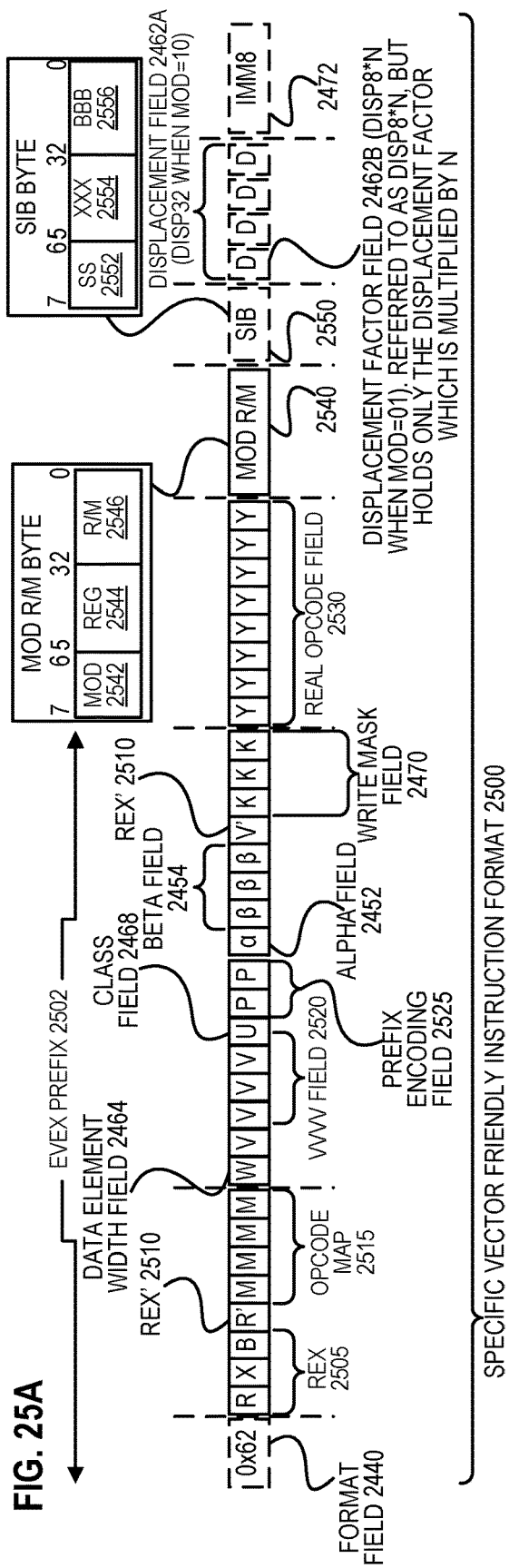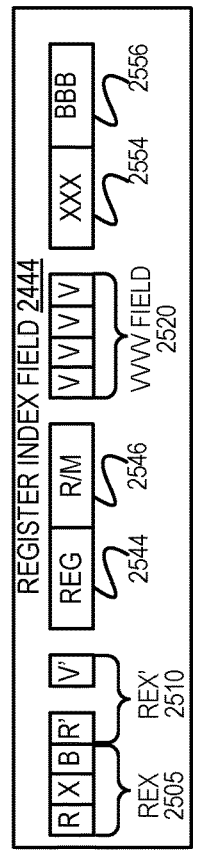
FIG. 25A
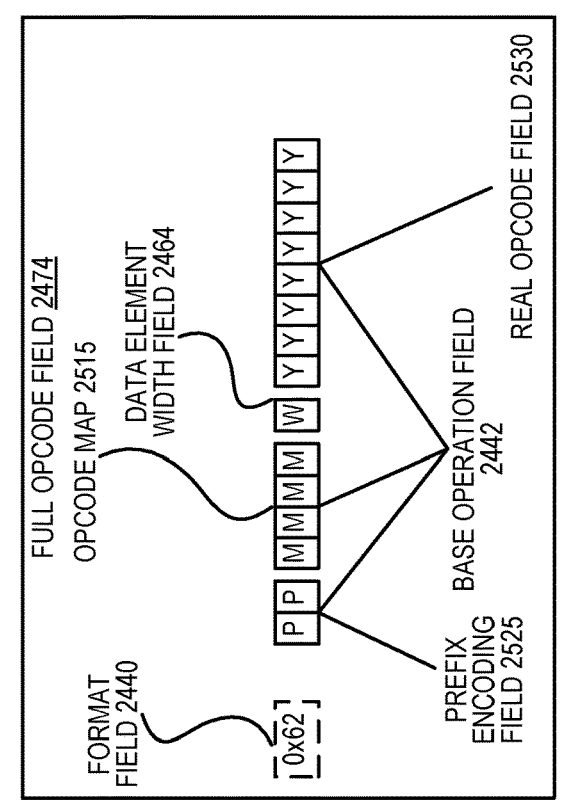
FIG. 25B
FIG. 25C

APPARATUSES, METHODS, AND SYSTEMS FOR INSTRUCTIONS FOR A HARDWARE ASSISTED HETEROGENEOUS INSTRUCTION SET ARCHITECTURE DISPATCHER

TECHNICAL FIELD

The disclosure relates generally to computer processor architecture, and, more specifically, to circuitry to implement instructions for a hardware assisted heterogeneous instruction set architecture (ISA) dispatcher.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 4 illustrates examples of instructions to enter and exit from a H-ISA state and an exception according to embodiments of the disclosure.

FIG. 5 illustrates examples of registers to set and detect heterogeneous features according to embodiments of the disclosure.

FIG. 6 illustrates an example format for a heterogeneous ISA dispatcher (HID) central processing unit (CPU) identification instruction (HIDCPUID instruction) according to embodiments of the disclosure.

FIG. 7 illustrates an example format for core type identifiers according to embodiments of the disclosure.

FIG. 8 illustrates an example format for a HID enter instruction (HIDENTER instruction) according to embodiments of the disclosure.

FIG. 9 illustrates state transitions outcomes for a HIDENTER instruction according to embodiments of the disclosure.

FIG. 10 illustrates an example format of reasons for a failure of a HIDENTER instruction to cause entry into a H-ISA state according to embodiments of the disclosure.

FIG. 11 illustrates an example format for a HID enter and migrate instruction (HIDENTERMIGRATE instruction) according to embodiments of the disclosure.

FIG. 12 illustrates state transitions outcomes for a HIDENTERMIGRATE instruction according to embodiments of the disclosure.

FIG. 13 illustrates an example format of reasons for a failure of a HIDENTERMIGRATE instruction to cause entry into a H-ISA state according to embodiments of the disclosure.

FIG. 14 illustrates an example format for a HID exit instruction (HIDEXIT instruction) according to embodiments of the disclosure.

FIG. 15 illustrates an example format for a model (e.g., machine) specific register indicating the H-ISA state and related status of a core according to embodiments of the disclosure.

FIG. 16 illustrates an example format for a model (e.g., machine) specific register to control the H-ISA functionality of a core according to embodiments of the disclosure.

FIG. 17 illustrates an example format for a heterogenous ISA exception according to embodiments of the disclosure.

FIG. 23 is a block flow diagram illustrating operations of a method of entering certain heterogenous ISA modes according to embodiments of the disclosure.

FIG. 25A is a block diagram illustrating fields for the generic vector friendly instruction formats in FIGS. 24A and 24B according to embodiments of the disclosure.

FIG. 25B is a block diagram illustrating the fields of the specific vector friendly instruction format in FIG. 25A that make up a full opcode field according to one embodiment of the disclosure.

FIG. 25C is a block diagram illustrating the fields of the specific vector friendly instruction format in FIG. 25A that make up a register index field according to one embodiment of the disclosure.

DETAILED DESCRIPTION

Figure 1:
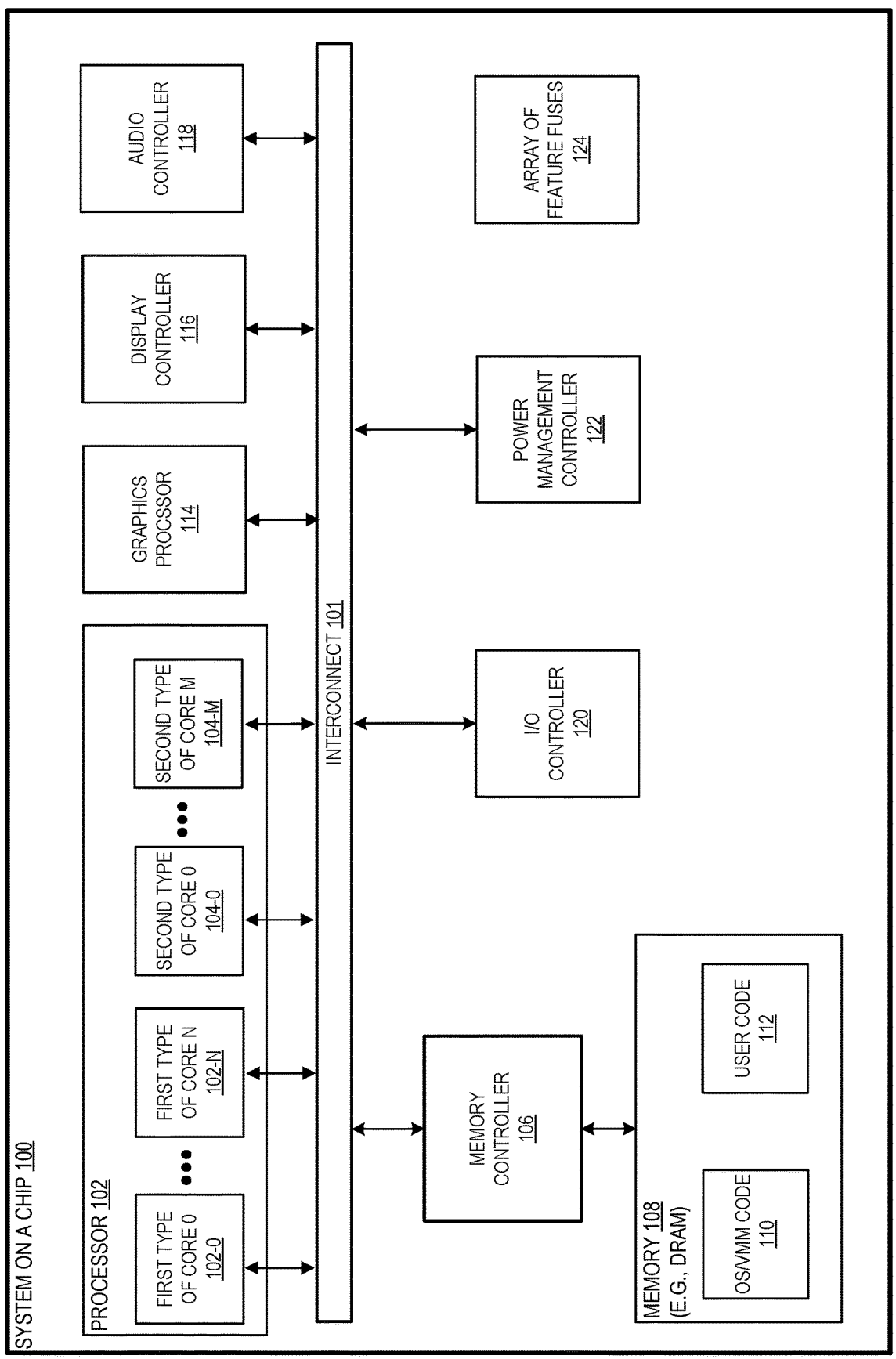
FIG. 1 illustrates a block diagram of a computer system including a processor having a plurality of cores of a first type and a plurality of cores of a second type according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. A system may include a plurality of cores, e.g., with a proper subset of cores in each socket of a plurality of sockets, e.g., of a system-on-a-chip (SoC). Each core (e.g., each processor or each socket) may access data storage (e.g., a memory).

In certain embodiments, a first proper subset of cores is of a first type and a second proper subset of cores is of a second different type, e.g., within a single system, processor, or SoC. In certain embodiments, a first type of core is a single threaded type of core (e.g., an Intel® Atom® processor core) (e.g., a "little" core) and a second type of core is a multiple-threaded (multi-threaded) type of core (e.g., an Intel® Core™ processor core) (e.g., a "big" core). In certain embodiments, the processor cores are built on a same (e.g., x86 and/or IA-64) architecture, e.g., but the first type of core and the second type of core do not support the exact same instruction set (e.g., do not have the exact same instruction set architecture). For example, certain ISA features are unique to a certain type of core, e.g., but those features (e.g., circuitry) and/or instructions that utilize those features are disabled (e.g., "fused out") in certain embodiments to preserve ISA symmetry (e.g., for a homogeneous ISA) among both the first type of cores and the second type of cores. In certain embodiments, vector (e.g., AVX-512) circuitry/ single instruction circuitry and/or instructions, multiple data (SIMD) circuitry and/or instructions, matrix operations circuitry and/or instructions, transactional synchronization (e.g., TSX or TSX-NI) circuitry and/or instructions, floating-point (e.g., FP16 and/or FP32) circuitry and/or instructions, simultaneous multithreading (e.g., hyperthreading) circuitry and/or instructions, or any combination thereof, are utilized (e.g., present) in a second type of core but not in a first type of core.

However, in certain embodiments it is desirable to not disable the entire processor (e.g., SoC) from utilizing such circuitry and/or instructions, e.g., as they provide significant performance improvements (e.g., despite consuming silicon die area when they are present but inactive (e.g., fused out)). Certain embodiments herein allow for the use of a heterogenous ISA for a single processor (e.g., SoC) having a first type of core (e.g., circuitry therein and/or supported instructions) and a second, different type of core (e.g., circuitry therein and/or supported instructions).

Embodiments herein provide for methods and apparatuses for a hardware assisted heterogeneous ISA (H-ISA) dispatcher. Embodiments herein of a hardware assisted heterogeneous ISA (H-ISA) solves the problems of ISA heterogeneity on heterogenous (e.g., hybrid) processors by defining a new state of execution (e.g., which may be referred to as "heterogeneous ISA state" ("H-ISA state") in which software can safely detect and execute heterogeneous instructions without the risk of a context switch to an unsupported core type. Embodiments herein provide a mechanism for software to opportunistically migrate to a more performant (e.g., having additional functionality) core when entering the H-ISA state, e.g., based on dynamic factors like core availability and power constraints. Embodiments herein include the (e.g., heterogeneous ISA dispatcher (HID)) architecture and ISA extensions to achieve H-ISA execution, e.g., a HIDENTER instruction, a HIDENTERMIGRATE instruction, a HIDEXIT instruction, a HIDCPUID instruction, H-ISA exception, a HID control register (e.g., IA32_HID_CTRL MSR), and a HID status register (e.g., IA32_HID_STATUS MSR).

In one embodiment, software thread hardware affinity to a certain core type is used, however, affinity based solutions rely heavily on an operating system (OS) (e.g., executing on the processor) from thread creation to destruction, lead to uneven distribution of workload, e.g., causing over subscription of a (e.g., second) core type core while there are other (e.g., first) core types that remain unused (e.g., idle) or underutilized, and enabling or adoption on low level libraries can be challenging due to OS specific dependencies.

Embodiments herein overcome these issues. Embodiments herein define a H-ISA state of execution, new ISA instructions, and the software flow for entry and exit from H-ISA state and detection of heterogeneous ISA features. In certain embodiments, execution of an enter instruction (e.g., having a HIDENTER mnemonic) causes a processor core (e.g., logical processor core) to enter a H-ISA state, e.g., and detects successful entry into the state. In certain embodiments, execution of an enter and migrate instruction (e.g., having a HIDENTERMIGRATE mnemonic) causes a processor core (e.g., logical processor core) to enter a H-ISA state with an intent to (e.g., opportunistically) migrate, e.g., to a more performant core if available. In certain embodiments, HID includes a specific exception vector used by the processor to migrate the software to more performant core upon availability. In certain embodiments, the control over entry and/or exit from H-ISA state relies on a (e.g., macro) instruction, e.g., and does not rely on OS software management.

In certain embodiments, execution of an exit instruction (e.g., having a HIDEXIT mnemonic) causes a processor core (e.g., logical processor core) to exit from a H-ISA state. In certain embodiments, execution of an identification instruction (e.g., having a HIDCPUID mnemonic) causes a processor core (e.g., logical processor core) to detect ISA features (e.g., circuitry and/or instructions) supported by a specific core type. In certain embodiments, HID includes a register (e.g., model/machine specific register (MSR)) (e.g., used by the operating system) to enable H-ISA state. In certain embodiments, HID includes a register (e.g., model/machine specific register (MSR)) (e.g., used by the operating system) to indicates the current (e.g., H-ISA) state to the operating system, e.g., and provides the operating system with the ability to save and restore the state (e.g., during a context swap).

Embodiments herein enable software ecosystem to use certain (e.g., AVX-512 ISA) extension(s) (e.g., on a client segment), for example, such that software optimized for those extension(s) (e.g., AVX512) can be fully leveraged on hybrid architecture with minimal enabling. Embodiments herein avoid over subscription of certain (e.g., second)(e.g., big) types of cores and prevent SW thread starvation when other (e.g., first)(e.g., small) types of cores are idle. Embodiments herein allow for a scalable hybrid architecture roadmap, e.g., as certain core types can have features/functionality added (e.g., and increase in die size) without having to fuse out features/functionality to preserve a homogeneous ISA. Embodiments herein provide a better performance and monetization per silicon die area. Embodiments here allow low level libraries to be enabled seamlessly without having to rely on an OS-specific application programming interface (API) to query or utilize the feature.

Turning now to FIG. 1, an example system architecture is depicted.

FIG. 1 illustrates a block diagram of a computer system 100 (e.g., on a single chip) including a processor 102 having a plurality of cores of a first type (102-0 to 102-N, e.g., where N is an integer greater than 0) and a plurality of cores of a second type (104-0 to 104-M, e.g., where M is an integer greater than 0) according to embodiments of the disclosure. A computer system may have a single type of either or both core types. In certain embodiments, system 100 (e.g., SoC) includes an interconnect (or bus) 101 between the components to allow communication therebetween, a memory controller 106, a memory 108, a graphics processor 114, a display controller 116, an audio controller 118, and input/output (e.g., peripherals) controller 120, a power management controller 122, and an array of feature fuses 124 (e.g., which can be set or not according to the disclosure herein). Memory 108 may include operating system (OS) and/or virtual machine monitor code 110 and user (e.g., program) code 112. Memory 108 may be memory separate from a core's memory (e.g., core's cache). Memory 108 may be DRAM.

Processor 102 may include hardware initialization manager (non-transitory) storage that stores hardware initialization manager firmware (e.g., or software). In one embodiment, the hardware initialization manager (non-transitory) storage stores Basic Input/Output System (BIOS) firmware. In another embodiment, the hardware initialization manager (non-transitory) storage stores Unified Extensible Firmware Interface (UEFI) firmware. In certain embodiments (e.g., triggered by the power-on or reboot of a processor), SoC 100 (e.g., core 102-0 thereof) executes the hardware initialization manager firmware (e.g., or software) stored in hardware initialization manager (non-transitory) storage to initialize the SoC 100 for operation, for example, to begin executing an operating system (OS) and/or initialize and test the (e.g., hardware) components of SoC. SoC may include one more of components in FIG. 33.

Figure 2:
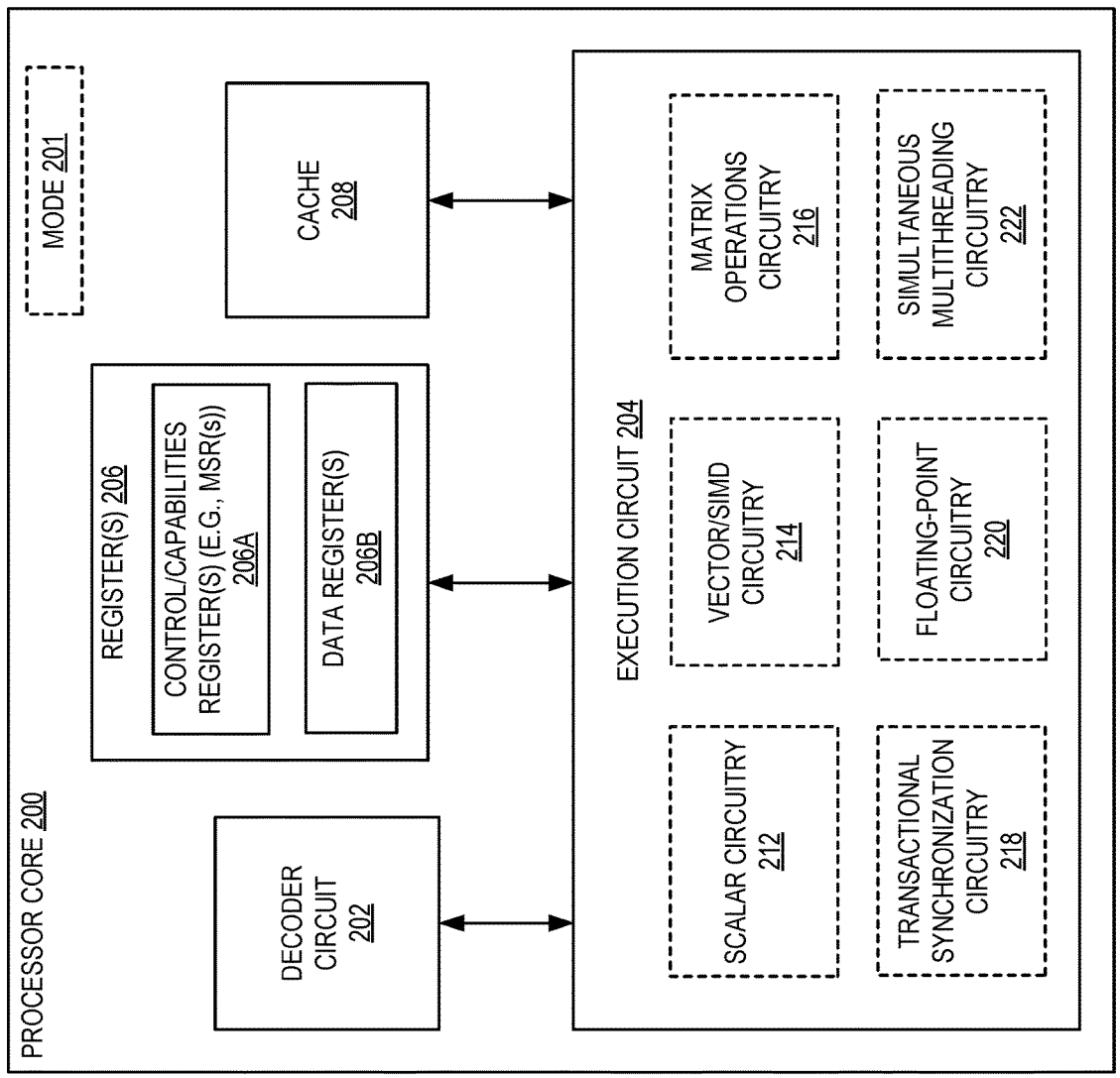
FIG. 2 illustrates a block diagram of a processor core according to embodiments of the disclosure.

FIG. 2 illustrates a block diagram of a processor core 200 according to embodiments of the disclosure. In certain embodiments, one or more of the components in processor core 200 are utilized (or present) in a first (or second) type of processor core but not utilized (or not present) in a second (of first) type of processor core. For example, with certain of the components not in a first type of processor core 102 in FIG. 1 and certain of the components within a second type of processor core 104 in FIG. 1. Hardware processor core 200 includes a mode 201 in certain embodiments, e.g., to set the (e.g., HID) mode (e.g., state) as discussed herein.

Depicted hardware processor 200 includes a hardware decoder circuit 202 (e.g., decode unit) and a hardware execution circuit 204 (e.g., execution unit). Depicted hardware processor 200 includes register(s) 206. In certain embodiments, registers 206 include one or more of control/capabilities registers 206A (e.g., CTRL MSR and/or STATUS MSR as discussed herein) and/or one or more of data registers 206B to access (e.g., load and/or store) data in, e.g., additionally or alternatively to access (e.g., load or store) of data in memory (e.g., memory 108 in FIG. 1). Depicted hardware processor 200 includes cache 208. Cache may include one or more cache banks to access (e.g., load and/or store) data in, e.g., additionally or alternatively to access (e.g., load or store) of data in memory (e.g., memory 108 in FIG. 1) and/or register(s) 206. The decoder 202, execution circuit 204, registers 206, and/or cache 208 may be of a single core of a processor, e.g., and multiple cores each with an instance of the circuitry may be included. The processor (e.g., and core thereof) may be a processor and/or core according to any of the disclosure herein.

In certain embodiments, execution circuit 204 includes one or more (e.g., any combination of) scalar circuitry 212, vector/single instruction, multiple data (SIMD) circuitry 214, matrix operations circuitry 216, transactional synchronization (e.g., TSX or TSX-NI) circuitry 218, floating-point (e.g., FP16 and/or FP32) circuitry 220, and/or simultaneous multithreading (e.g., hyperthreading) circuitry 222. In one embodiment, matrix operations circuitry includes a two-dimensional grid of multiplier circuits (e.g., fused multiply-add circuits), a first plurality of registers that represents a first two-dimensional (e.g., input) matrix coupled to the matrix operations accelerator circuit, a second plurality of registers that represents a second two-dimensional (e.g., input) matrix coupled to the matrix operations accelerator circuit, and/or a third plurality of registers that represents a third two-dimensional (e.g., output) matrix coupled to the matrix operations accelerator circuit. In certain embodiments, one or more (e.g., any combination of) scalar circuitry 212, vector/single instruction, multiple data (SIMD) circuitry 214, matrix operations circuitry 216, transactional synchronization (e.g., TSX or TSX-NI) circuitry 218, floating-point (e.g., FP16 and/or FP32) circuitry 220, and/or simultaneous multithreading (e.g., hyperthreading) circuitry 222 are not utilizable (e.g., they are fused out) or present in a core.

In certain embodiments, scalar circuitry 212 operates on scalar values (e.g., single numbers). In certain embodiments, vector/SIMD circuitry 214 operates on vector or packed data values. In certain embodiments, matrix operations circuitry 216 operates on one or more matrices.

Scalar circuitry 212, vector/single instruction, multiple data (SIMD) circuitry 214, matrix operations circuitry 216, transactional synchronization (e.g., TSX or TSX-NI) circuitry 218, floating-point (e.g., FP16 and/or FP32) circuitry 220, and/or simultaneous multithreading (e.g., hyperthreading) circuitry 222 may be included in a core or as an (e.g., external) accelerator.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Hardware decoder 202 may receive an (e.g., single) instruction (e.g., macro-instruction) and decode the instruction, e.g., into micro-instructions and/or micro-operations. Hardware execution circuit 204 may execute the decoded instruction (e.g., macro-instruction) to perform an operation or operations. For example, an instruction to be decoded by decoder 202 and for the decoded instruction to be executed by execution circuit 204 may be any (e.g., HID) instruction discussed herein, e.g., as recited in FIG. 4.

Certain embodiments herein utilize a new state of execution called heterogeneous ISA state (e.g., referred to as H-ISA state) which provides a (e.g., safe) mechanism for software to take advantage of heterogeneous processor instructions that may be available only on a proper subset of cores (e.g., logical processors or CPUs) in a processor. In certain embodiments, if the software flow (e.g., one or more threads of instructions) is interrupted or context switched during execution inside the H-ISA state, it will be rescheduled to resume execution only on a processor that supports the ISA feature(s) used inside the H-ISA state, e.g., thereby avoiding an exception (e.g., undefined (#UD) exception) due to inadvertent execution on an unsupported core (e.g., processor. In certain embodiments, software enters the H-ISA state using IDENTER/HIDENTERMIGRATE instructions with an identifier that conveys the core type supporting the ISA feature(s) that software intends to use inside the H-ISA state. In certain embodiments, software exits the H-ISA state using HIDEXIT instruction. The following flow diagram in FIG. 3 describes the state transition from normal (e.g., homogeneous ISA) state to a H-ISA state.

Figure 3:
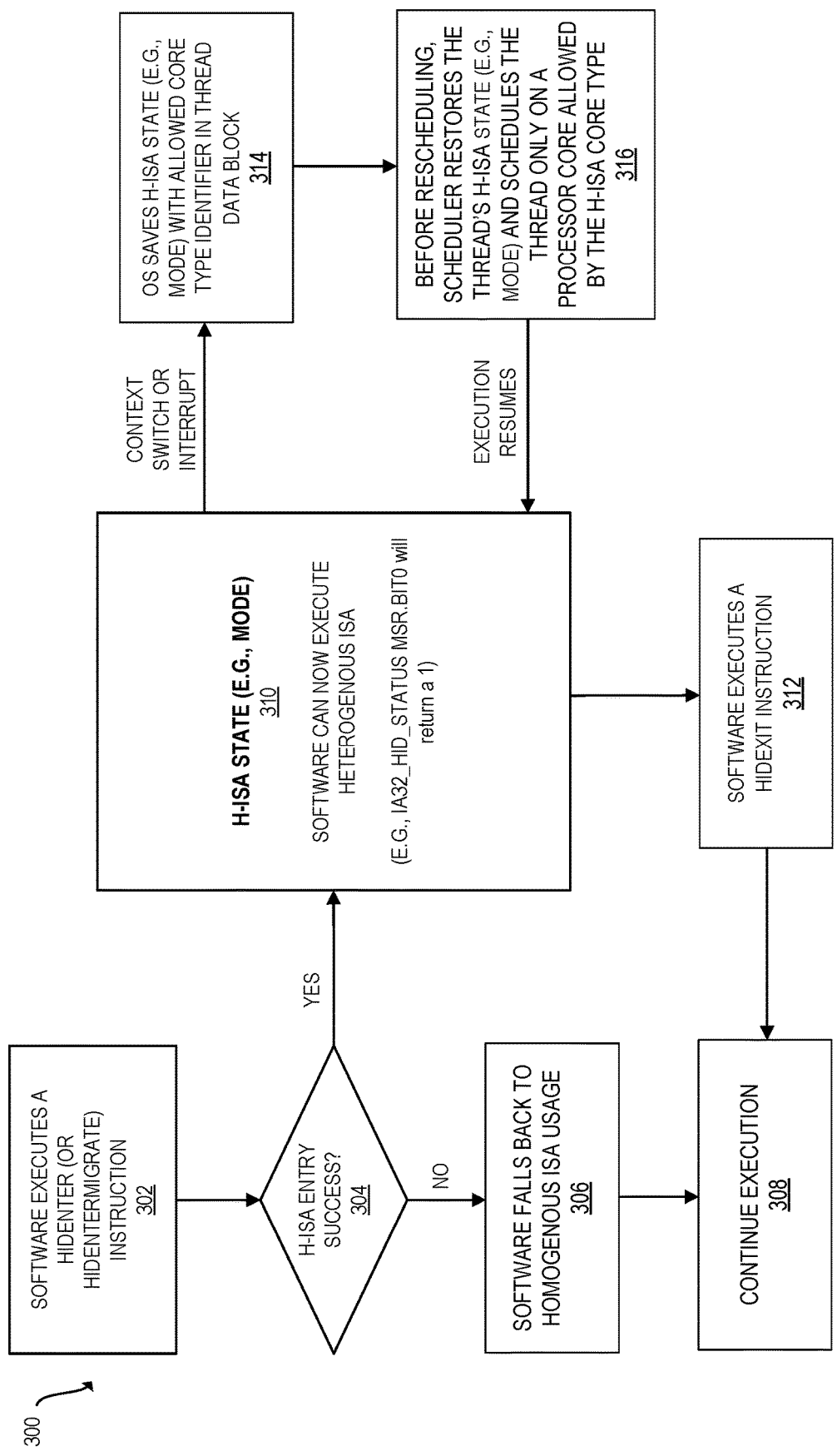
FIG. 3 is a flow diagram illustrating operations of a method of transitioning a processor core from a homogenous ISA state to a heterogenous ISA (H-ISA) state to embodiments of the disclosure.

FIG. 3 is a flow diagram illustrating operations 300 of a method of transitioning a processor core from a (e.g., default) homogenous ISA state to a heterogenous ISA (H-ISA) state to embodiments of the disclosure. Depicted operations 300 include software causing execution of a HIDENTER (OR HIDENTERMIGRATE) instruction at 302, then the processor core (e.g., an execution circuit thereof) checking if H-ISA was entered at 304, and if not, the software falls back to homogeneous ISA usage at 306 (e.g., and thus those H-ISA only features are not available), and the software (e.g., thread) continues execution on that processor core at 308, and if yes, the processor core (e.g., logical core or physical core) enters into H-ISA state (e.g., mode) at 310 (e.g., such that the software executing on the processor core can now execute the instructions that are only supported by an ISA feature(s) inside that type of core). In certain embodiments, the processor core remains in H-ISA state until (i) the software executed a HIDEXIT instruction at 312 (e.g., transitioning the processor core back to the homogenous ISA state) or (ii) a context switch, interrupt, etc. occurs. In certain embodiments, an interrupt or context switch received during execution in H-ISA state (e.g., mode) causes the (e.g., OS to) saves H-ISA state (e.g., mode) indication with an allowed core type identifier (e.g., in the thread's data block) at 314, and, before rescheduling, (e.g., the OS's) scheduler restores the thread's H-ISA state (e.g., mode) and schedules the thread only on a processor core allowed by the H-ISA core type at 316, e.g., and resumes operating in the H-ISA state at 310.

FIG. 4 illustrates examples 400 of instructions (e.g., ISA extension(s)) to enter and exit from a H-ISA state (e.g., mode) and an exception according to embodiments of the disclosure. Examples 400 includes a HIDCPUID instruction, that when executed, reports the heterogeneous ISA features of the processor core (e.g., logical core or CPU), a HIDENTER instruction, that when executed, causes the requesting (e.g., logical) processor core to enter H-ISA execution mode, a HIDENTERMIGRATE instruction, that when executed, causes the requesting (e.g., logical) processor core to enter H-ISA execution mode (e.g., with an intent to migrate to a more performant core if available), a HIDEXIT instruction, that when executed, causes the requesting (e.g., logical) processor core in H-ISA execution mode to exit H-ISA execution mode, and a H-ISA Exception, that when occurs, raises an exception to migrate software (e.g., a thread) to a different core type.

FIG. 5 illustrates examples 500 of registers to set and detect heterogeneous features according to embodiments of the disclosure. Examples 500 include a control register (e.g., IA32_HID_CTRL MSR) that has a first field to store one or more bits that indicate H-ISA state is enabled for that processor core and/or a second field to store one or more bits that indicate H-ISA migration is enabled for that processor core and a status register (e.g., IA32_HID_STATUS MSR) that returns a value (e.g., to a data register) that indicates the current (e.g., H-ISA or not) execution state.

FIG. 6 illustrates an example format 600 for a heterogeneous ISA dispatcher (HID) central processing unit (CPU) identification instruction (HIDCPUID instruction) according to embodiments of the disclosure. In certain embodiments, execution of a HIDCPUID instruction returns heterogeneous feature information (e.g., for a requesting processor core) in data register(s), e.g., EAX, EBX, ECX, and EDX registers. In certain embodiments, the instruction's output is dependent on the leaf number specified in EAX (e.g., and sub-leaf number specified in ECX) and the core type identifier specified (e.g., in EBX register). FIG. 7 lists example core type identifiers that can be programmed into a (e.g., EBX) data register. In certain embodiments, CPUID.1AH:EAX[31:24] enumerates the core type identifier for the current processor core (e.g., logical processor). In certain embodiments, HIDCPUID can be executed at any privilege level (e.g., supervisor level or user level).

FIG. 7 illustrates an example format 700 for core type identifiers according to embodiments of the disclosure. Although two types of cores are indicated in FIG. 7, it should be understood that any other number, e.g., 3 or more, types of cores may be utilized. The core type may include an indication of ISA support for each corresponding core type.

FIG. 8 illustrates an example format 800 for a HID enter instruction (HIDENTER instruction) according to embodiments of the disclosure. In certain embodiments, execution of a HIDENTER instruction causes that processor core to transition into a H-ISA state for the core type identifier specified (e.g., within the instruction or within a data (e.g., RBX) register).

In certain embodiments, HIDENTER is a companion instruction to HIDEXIT. In certain embodiments, successful execution of the HIDENTER instruction sets a flag (e.g., the zero flag (ZF) to 1, e.g., and in case of failure, the flag is reset to zero (e.g., and a failure reason is returned into a register (e.g., in RBX)). In certain embodiments, software is to (e.g., always) check the state transition result by reading the (e.g., ZF) flag before resuming execution. In certain embodiments, HIDENTER can be executed at any privilege level. FIG. 9 lists example core type identifier inputs and state transition outcomes. In certain embodiments, prior to executing HIDENTER, the H-ISA (e.g., state) functionality is enabled by the operating system by writing to an MSR, e.g., by setting a bit in IA32_HID_CTRL MSR such that (e.g., Bit 0: H-ISA Enable) to 1 instead of zero (or vice-versa).

FIG. 9 illustrates state transitions outcomes 900 for a HIDENTER instruction according to embodiments of the disclosure.

FIG. 10 illustrates an example format 1000 of reasons (e.g., returned in RBX when H-ISA state transition fails) for a failure of a HIDENTER instruction to cause entry into a H-ISA state according to embodiments of the disclosure.

FIG. 11 illustrates an example format 1100 for a HID enter and migrate instruction (HIDENTERMIGRATE instruction) according to embodiments of the disclosure. In certain embodiments, execution of a HIDENTERMIGRATE instruction causes that processor core to transition into a H-ISA state for the core type identifier specified (e.g., within the instruction or within a data (e.g., RBX) register) and, if the currently executing core does not meet the core type identifier requirement specified (e.g., in RBX register) (e.g., or if a more performant core is available), hardware (e.g., the core) will raise an exception to the steer the software thread to another processor core. In certain embodiments, HIDENTERMIGRATE is a companion instruction to HIDEXIT.

In certain embodiments, successful execution of the HIDENTERMIGRATE instruction sets a flag (e.g., the zero flag (ZF) to 1, e.g., and in case of failure, the flag is reset to zero (e.g., and a failure reason is returned into a register (e.g., in RBX)). In certain embodiments, software is to (e.g., always) check the state transition result by reading the (e.g., ZF) flag before resuming execution. In certain embodiments, HIDENTERMIGRATE can be executed at any privilege level. FIG. 12 lists example core type identifier inputs and state transition outcomes. In certain embodiments, prior to executing HIDENTERMIGRATE, the H-ISA (e.g., state) migrate functionality is enabled by the operating system by writing to an MSR and programming an exception handler accordingly, e.g., by setting a HID enable bit in IA32_HID_CTRL MSR such that (e.g., Bit 0: H-ISA Enable) to 1 instead of zero (or vice-versa), setting the register handler for H-ISA exception, and setting an HID migrate bit in IA32_HID_CTRL MSR (e.g., Bit 1: H-ISA Migration Enable) to 1 instead of zero (or vice-versa).

FIG. 12 illustrates state transitions outcomes 1200 for a HIDENTERMIGRATE instruction according to embodiments of the disclosure.

In certain embodiments, when (e.g., software is) executing an HIDENTERMIGRATE on one core type and is targeting to use an ISA of another core type, hardware is to raise an exception to steer the thread to the requested core type for usage of heterogeneous ISA. In certain embodiments, this can result in the software thread being suspended for several cycles before it can resume execution. If software wants to perform a fast check-once type approach, it may use HIDENTER instead in certain embodiments.

FIG. 13 illustrates an example format 1300 of reasons (e.g., returned in RBX when H-ISA state transition/migrate fails) for a failure of a HIDENTERMIGRATE instruction to cause entry into a H-ISA state according to embodiments of the disclosure.

FIG. 14 illustrates an example format 1400 for a HID exit instruction (HIDEXIT instruction) according to embodiments of the disclosure. In certain embodiments, execution of a HIDEXIT instruction causes that processor core (e.g., executing in a H-ISA state) to exit the H-ISA state, e.g., and return back to the homogenous state. It is a companion instruction to HIDENTER/HIDENTERMIGRATE. In certain embodiments, reading MSR (e.g., IA32_HID_STATUS.BIT0) will return 0 after execution of HIDEXIT. In certain embodiments, HIDEXIT can be executed at any privilege level.

FIG. 15 illustrates an example format 1500 for a model (e.g., machine) specific register indicating the H-ISA state and related status of a core according to embodiments of the disclosure. In certain embodiments, the IA32_HID_STATUS MSR is a (e.g., thread-specific) MSR that conveys the current H-ISA state of the processor core (e.g., logical processor). In certain embodiments, an operating system is to save and restore the H-ISA state of a software thread during a context switch.

FIG. 16 illustrates an example format 1600 for a model (e.g., machine) specific register to control the H-ISA functionality of a core according to embodiments of the disclosure. In certain embodiments, the MSR IA32_HID_CTRL is a (e.g., package level) MSR used to enable H-ISA state (e.g., on a system). In certain embodiments, an operating system performs necessary initializations and then writes to that MSR, e.g., during boot. In certain embodiments, any subsequent write will be ignored after they are locked. In certain embodiments, the lock is reset when the processor (e.g., CPU) is reset.

FIG. 17 illustrates an example format 1700 for a heterogenous ISA exception according to embodiments of the disclosure. In certain embodiments, the heterogenous ISA exception indicates that, with H-ISA enabled (e.g., the H-ISA flag in IA32_HID_CTRL MSR is set), the processor core (e.g., logical processor) detected the following condition: software attempted to enter H-ISA state with intent to migrate for a specific core type (e.g., by executing HIDENTERMIGRATE instruction) that is different than the core type where it is currently running. In certain embodiments, an exception handler recovers from the H-ISA exception (e.g., fault) and resumes execution without any loss of program continuity by rescheduling the software thread to any processor core having the core type information specified in error code.

Figure 18:
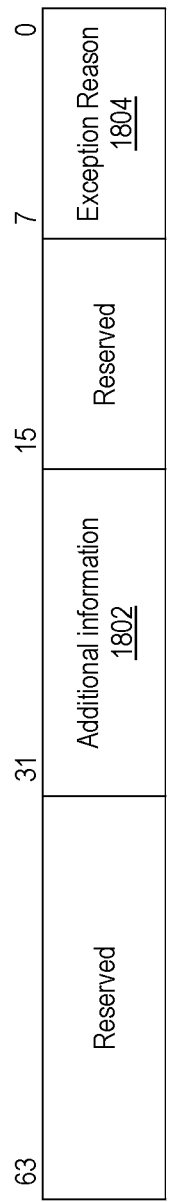
FIG. 18 illustrates an example format for a heterogenous ISA error code according to embodiments of the disclosure.

FIG. 18 illustrates an example format 1800 for a heterogenous ISA error code according to embodiments of the disclosure. In certain embodiments, the processor core provides the H-ISA exception handler with error code information with format as described below: exception reason (e.g., bits 7:0) field that provides an (e.g., 8-bit) identifier that conveys the reason for the H-ISA exception, and (optionally) additional information (e.g., in bits 31:16) that provides additional optional information for the exception handler depending on the exception reason. For example, the exception reasons may store a value (e.g., 01H) that indicates (e.g., for a H-ISA migration) that the exception was caused by software executing HIDENTERMIGRATE with core type identifier (e.g., in RBX) different than the one it is currently executing, and the processor core (e.g., logical processor) has detected that at least one processor core (e.g., logical processor) of the requested core type is available (e.g., currently idle) and/or it is more performant than current core type. Other reasons can be added as desired.

For example, the additional information may store values (e.g., for H-ISA migration) where a first field (e.g., bits 23:16) indicate a target core type identifier, and a second field (e.g., bits 31:24) is reserved. The "additional information" format may be different for other exception reasons.

Certain embodiments herein allow for the preserving of H-ISA state across context switches. For example, when the OS is rescheduling a thread with an active H-ISA state, the scheduler is to schedule the thread only on core types specified in H-ISA status MSR.

The following steps describes example OS actions during a context switch to save and restore the H-ISA state for the SW threads: read IA32_HID_STATUS MSR to get old thread's H-ISA status and core type identifier (e.g., save it to the old thread data), and write the H-ISA state for new thread to IA32_HID_STATUS MSR.

Figure 19:
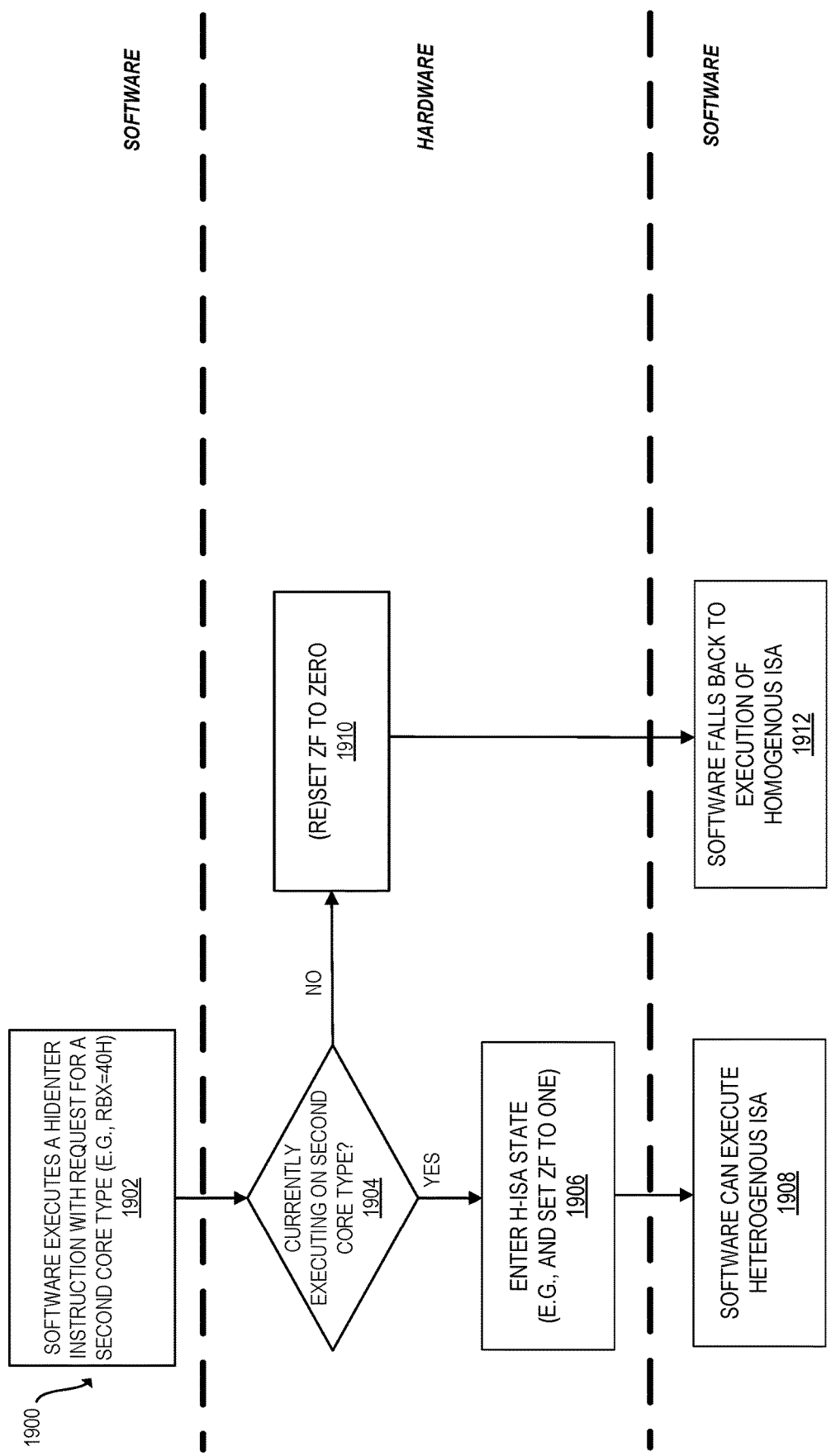
FIG. 19 is a flow diagram illustrating operations of a method of software executing a HIDENTER instruction in an attempt to enter into a H-ISA state targeting a core of a second type according to embodiments of the disclosure.

FIG. 19 is a flow diagram illustrating operations 1900 of a method of software executing a HIDENTER instruction in an attempt to enter into a H-ISA state targeting a core of a second type according to embodiments of the disclosure. In certain embodiments, operations 1900 include, at 1902, software executing a HIDENTER instruction with request for a second core type (e.g., RBX=40H), and checking at 1904 if currently executing on second core type, and if not, setting a flag (e.g., ZF) to zero at 1910, and the software returning (e.g., falling) back to execution of a homogenous ISA at 1912, and if yes, entering H-ISA state (e.g., and setting the flag (e.g., ZF) to one) at 1906, and software can then execute the heterogeneous (e.g., instruction of) ISA at 1908.

Figure 20:
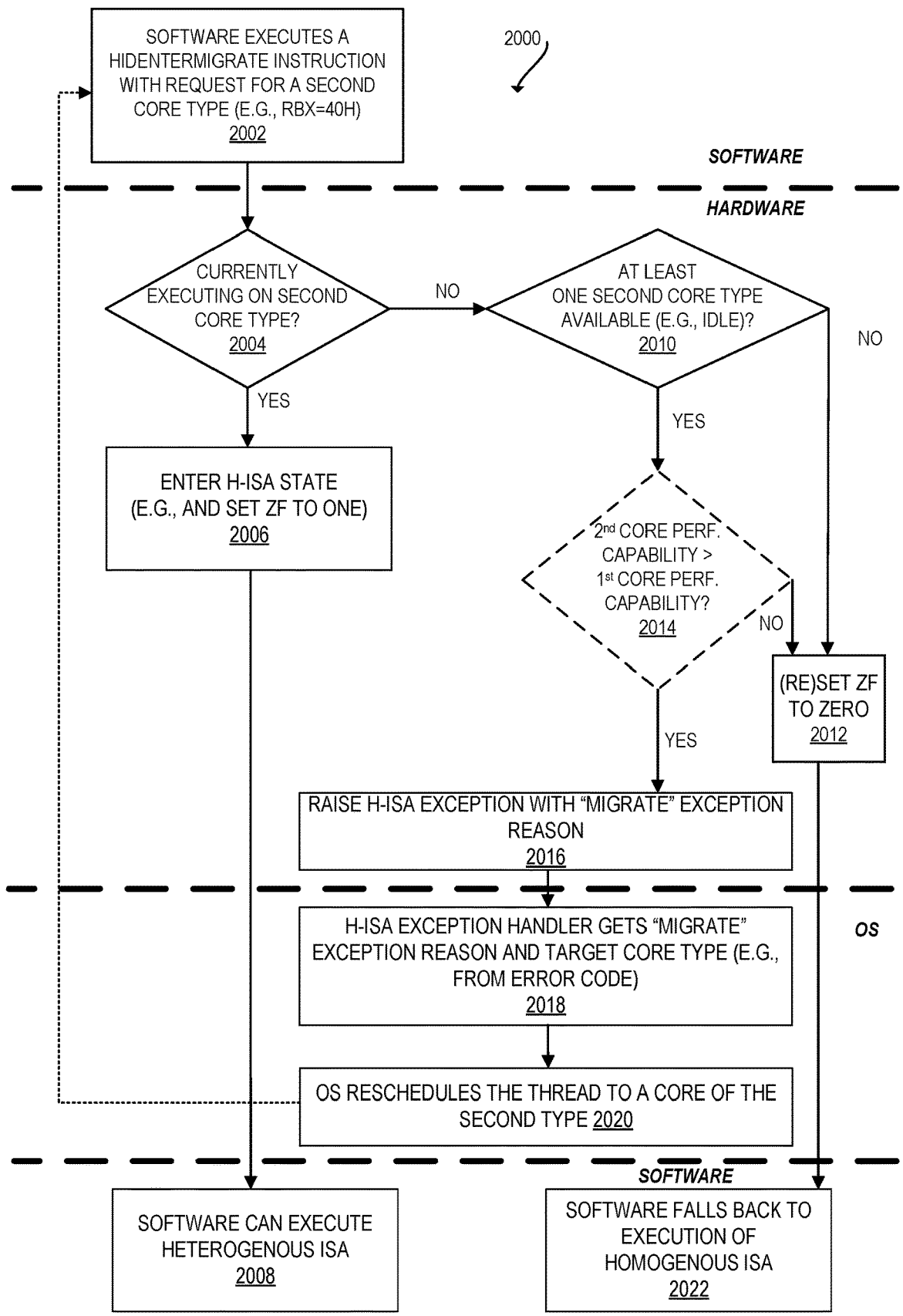
FIG. 20 is a flow diagram illustrating operations of a method of software executing a HIDENTERMIGRATE instruction in an attempt to enter into a H-ISA state targeting a core of a second type according to embodiments of the disclosure.

In certain embodiments, software is to execute HIDENTERMIGRATE when it wants to enter H-ISA state and use heterogeneous features. In certain embodiments, the processor (e.g., core) will raise a H-ISA exception when the target core type identifier that software provides (e.g., in RBX) is different from the core type that it is currently executing on. FIG. 20 describes example steps at hardware, software, and operating system (OS) level for a H-ISA migration.

FIG. 20 is a flow diagram illustrating operations 2000 of a method of software executing a HIDENTERMIGRATE instruction in an attempt to enter into a H-ISA state targeting a core of a second type according to embodiments of the disclosure. In certain embodiments, operations 2000 include, at 2002, software executing a HIDENTERMIGRATE instruction with request for a second core type (e.g., RBX=40H), and checking at 2004 if currently executing on second core type, and if yes at 2004, entering H-ISA state (e.g., and setting the flag (e.g., ZF) to one) at 2006, and software can then execute the heterogeneous (e.g., instruction of) ISA at 2008, and if no at 2004, checking at 2010 is at least one core of the second type is available (e.g., idle) at 2010 and if no at 2010, setting a flag (e.g., ZF) to zero at 2012, and the software returning (e.g., falling) back to execution of a homogenous ISA at 2022, and if yes at 2010 (optionally) checking if the second core's performance capability is greater than the first core's performance capability, and if no at 2014, setting a flag (e.g., ZF) to zero at 2012, and the software returning (e.g., falling) back to execution of a homogenous ISA at 2022, and if yes at 2014 (or if 2014 is not utilized), raising an H-ISA exception with "migrate" exception as the reason at 2016, and the (e.g., OS) H-ISA exception handler getting "migrate" exception and target core type (e.g., from error code format in FIG. 18) at 2018, and rescheduling the thread to a core of the second type at 2020, e.g., and optionally returning to 2002 when the thread resumes execution on the newly scheduled core.

Figure 21:
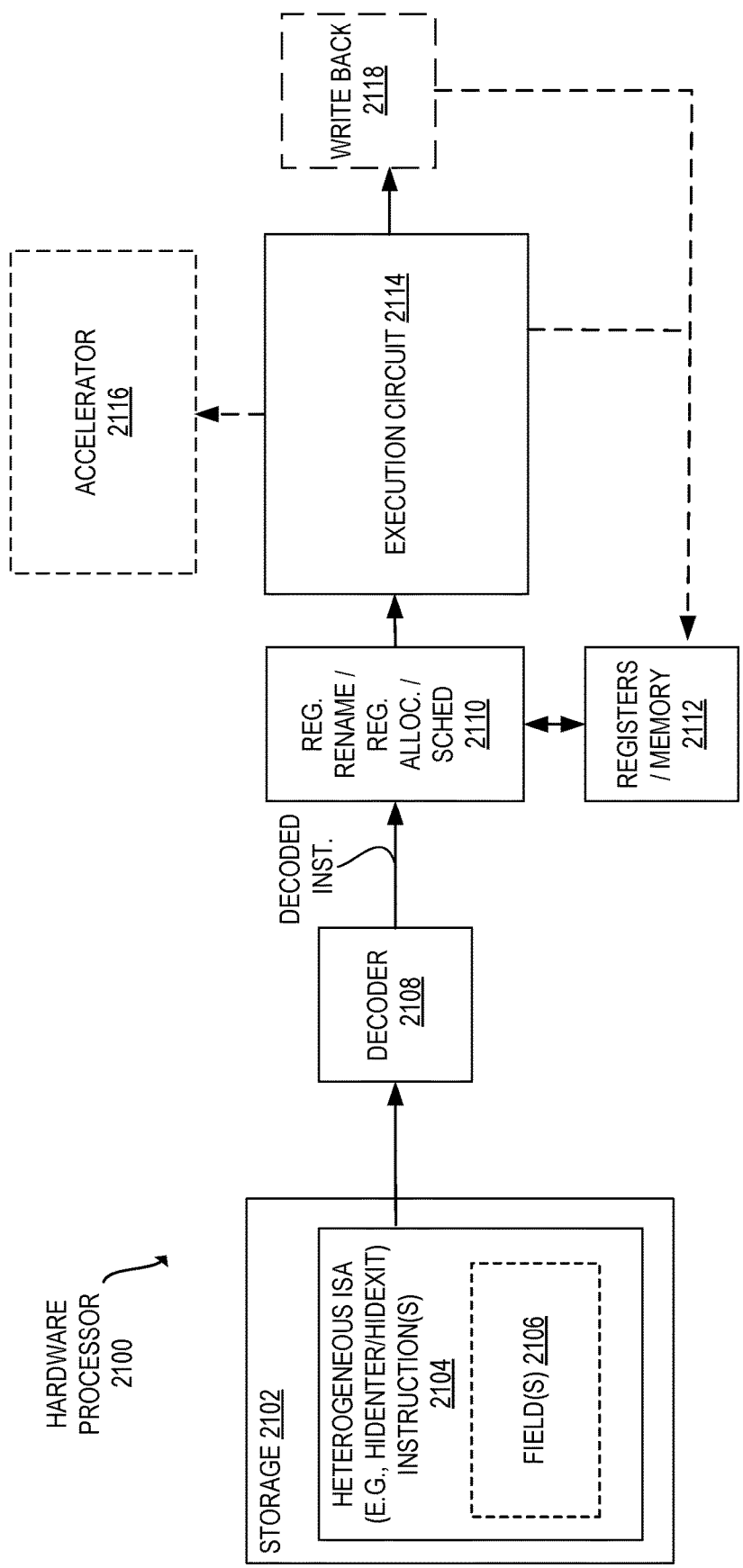
FIG. 21 illustrates a hardware processor coupled to storage that includes one or more heterogeneous ISA (e.g., HIDENTER/HIDEXIT) instructions according to embodiments of the disclosure.

FIG. 21 illustrates a hardware processor 2100 coupled to storage that includes one or more heterogeneous ISA (e.g., HIDENTER/HIDEXIT) instructions according to embodiments of the disclosure. In certain embodiments, an instruction 2104 is according to any of the disclosure herein. In certain embodiments, instruction 2104 includes and/or identifies one or more fields 2106.

In one embodiment, e.g., in response to a request to perform an operation, the instruction (e.g., macro-instruction) is fetched from storage 2102 and sent to decoder 2108. In the depicted embodiment, the decoder 2108 (e.g., decoder circuit) decodes the instruction into a decoded instruction (e.g., one or more micro-instructions or micro-operations). The decoded instruction is then sent for execution, for example, via scheduler circuit 2110 to schedule the decoded instruction for execution.

In certain embodiments, (e.g., where the processor/core supports out-of-order (OoO) execution), the processor includes a register rename/allocator circuit 2110 coupled to register file/memory circuit 2112 (e.g., unit) to allocate resources and perform register renaming on registers (e.g., registers associated with the initial sources and final destination of the instruction). In certain embodiments, (e.g., for out-of-order execution), the processor includes one or more scheduler circuits 2110 coupled to the decoder 2108. The scheduler circuit(s) may schedule one or more operations associated with decoded instructions, including one or more operations decoded from an instruction 2104, e.g., for offloading execution of an operation to accelerator 2116 by the execution circuit 2114.

In certain embodiments, a write back circuit 2118 is included to write back results of an instruction to a destination (e.g., write them to a register(s) and/or memory), for example, so those results are visible within a processor (e.g., visible outside of the execution circuit that produced those results).

One or more of these components (e.g., decoder 2108, register rename/register allocator/scheduler 2110, execution circuit 2114, registers (e.g., register file)/memory 2112, or write back circuit 2118) may be in a single core of a hardware processor (e.g., and multiple cores each with an instance of these components).

Figure 22:
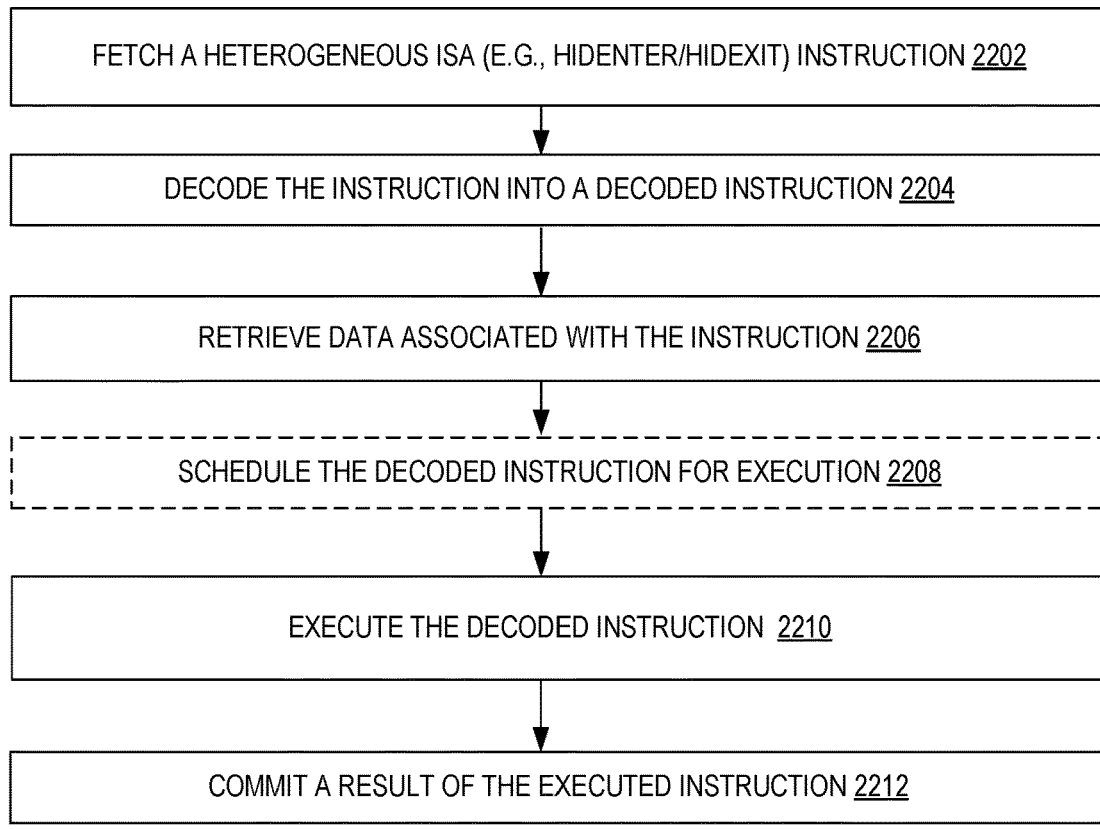
FIG. 22 is a flow diagram illustrating operations of a method for processing a heterogeneous ISA enter (e.g., HIDENTER) instruction according to embodiments of the disclosure.

FIG. 22 is a flow diagram illustrating operations of a method for processing a heterogeneous ISA enter (e.g., HIDENTER) instruction according to embodiments of the disclosure. A processor (e.g., or processor core) may perform operations 2200 of method, e.g., in response to receiving a request to execute an instruction from software. Depicted operations 2200 includes processing a heterogeneous ISA (e.g., HIDENTER/HIDEXIT) instruction by performing a: fetch of an instruction (e.g., having an instruction opcode corresponding to the heterogeneous ISA (e.g., HIDENTER/HIDEXIT) instruction 2202, decode of the instruction into a decoded instruction 2204, retrieve data associated with the instruction 2206, (optionally) schedule the decoded instruction for execution 2208, execute the decoded instruction to enqueue a job in an accelerator circuit 2210, and commit a result of the executed instruction 2212.

FIG. 23 is a block flow diagram illustrating operations 2300 of a method of entering certain heterogenous ISA modes according to embodiments of the disclosure.

Some or all of the operations 2300 (or other processes described herein, or variations, and/or combinations thereof) are performed under the control of an encryption circuit. The operations 2300 include, at block 2302, decoding, by a decoder circuit of a processor core of a plurality of processor cores comprising a first type of processor core that supports a first instruction set architecture and a second type of processor core that supports a second different instruction set architecture, a single instruction into a decoded single instruction, the single instruction including a field that identifies a requested core type and an opcode that indicates an execution circuit of the processor core is to: read a register to determine a core type of the processor core, cause the processor core to enter a first mode, that only permits execution of the first instruction set architecture by the processor core, when the requested core type and the core type of the processor core are the first type, cause the processor core to enter a second mode, that only permits execution of the second different instruction set architecture by the processor core, when the requested core type and the core type of the processor core are the second type, cause the processor core to enter a third mode, that only permits execution of the first instruction set architecture by the processor core, when the requested core type is the second type and the core type of the processor core is the first type, and cause the processor core to enter a fourth mode, that only permits execution of the second different instruction set architecture by the processor core, when the requested core type is the first type and the core type of the processor core is the second type. The operations 2300 further include, at block 2304, executing the decoded single instruction by the execution circuit of the processor core according to the opcode.

Exemplary architectures, systems, etc. that the above may be used in are detailed below. Exemplary instruction formats for the instructions disclosed herein are detailed below.

At least some embodiments of the disclosed technologies can be described in view of the following examples:

Example 1. An apparatus comprising:
a plurality of processor cores comprising a first type of processor core that supports a first instruction set architecture and a second type of processor core that supports a second different instruction set architecture;
a decoder circuit of a processor core of the plurality of processor cores to decode a single instruction into a decoded single instruction, the single instruction including a field that identifies a requested core type and an opcode that indicates an execution circuit of the processor core is to:
read a register to determine a core type of the processor core,
cause the processor core to enter a first mode, that only permits execution of the first instruction set architecture by the processor core, when the requested core type and the core type of the processor core are the first type,
cause the processor core to enter a second mode, that only permits execution of the second different instruction set architecture by the processor core, when the requested core type and the core type of the processor core are the second type,
cause the processor core to enter a third mode, that only permits execution of the first instruction set architecture by the processor core, when the requested core type is the second type and the core type of the processor core is the first type, and
cause the processor core to enter a fourth mode, that only permits execution of the second different instruction set architecture by the processor core, when the requested core type is the first type and the core type of the processor core is the second type; and
the execution circuit of the processor core to execute the decoded single instruction according to the opcode.

Example 2. The apparatus of example 1, wherein the opcode indicates the execution circuit of the processor core is to set a bit in a flag register to a first value when entering the first mode and the second mode, and to a second value when entering the third mode and the fourth mode.

Example 3. The apparatus of example 1, wherein the second different instruction set architecture is the first instruction set architecture and one or more additional instructions not supported by the first type of processor core.

Example 4. The apparatus of example 3, wherein, when execution of the processor core is interrupted when in the second mode, the execution is resumed only on another processor core of the plurality of processing cores that is the second type.

Example 5. The apparatus of example 3, wherein:
the decoder circuit of the processor core is to decode a second single instruction into a decoded second single instruction, the second single instruction including an opcode that indicates the execution circuit of the processor core is to cause the processor core to switch from the second mode to the first mode that only permits execution of the first instruction set architecture by the processor core; and
the execution circuit of the processor core to execute the decoded second single instruction according to the opcode.

Example 6. The apparatus of example 1, wherein, when execution of the processor core is interrupted when in the modes, the execution is resumed only on another processor core of the plurality of processing cores that is a corresponding type for that mode.

Example 7. The apparatus of example 1, wherein, when execution of the processor core is context switched when in the modes, the execution is resumed only on another processor core of the plurality of processing cores that is a corresponding type for that mode.

Example 8. The apparatus of example 1, wherein the opcode indicates the execution circuit of the processor core is to raise an exception to steer execution to another processor core of the plurality of processing cores that is the requested core type when in the third mode or the fourth mode.

Example 9. A method comprising:
decoding, by a decoder circuit of a processor core of a plurality of processor cores comprising a first type of processor core that supports a first instruction set architecture and a second type of processor core that supports a second different instruction set architecture, a single instruction into a decoded single instruction, the single instruction including a field that identifies a requested core type and an opcode that indicates an execution circuit of the processor core is to:
  read a register to determine a core type of the processor core,
  cause the processor core to enter a first mode, that only permits execution of the first instruction set architecture by the processor core, when the requested core type and the core type of the processor core are the first type,
  cause the processor core to enter a second mode, that only permits execution of the second different instruction set architecture by the processor core, when the requested core type and the core type of the processor core are the second type,
  cause the processor core to enter a third mode, that only permits execution of the first instruction set architecture by the processor core, when the requested core type is the second type and the core type of the processor core is the first type, and
  cause the processor core to enter a fourth mode, that only permits execution of the second different instruction set architecture by the processor core, when the requested core type is the first type and the core type of the processor core is the second type; and
executing the decoded single instruction by the execution circuit of the processor core according to the opcode.

Example 10. The method of example 9, wherein the opcode indicates the execution circuit of the processor core is to set a bit in a flag register to a first value when entering the first mode and the second mode, and to a second value when entering the third mode and the fourth mode.

Example 11. The method of example 9, wherein the second different instruction set architecture is the first instruction set architecture and one or more additional instructions not supported by the first type of processor core.

Example 12. The method of example 11, wherein, when execution of the processor core is interrupted when in the second mode, the execution is resumed only on another processor core of the plurality of processing cores that is the second type.

Example 13. The method of example 11, further comprising:
decoding a second single instruction by the decoder circuit of the processor core into a decoded second single instruction, the second single instruction including an opcode that indicates the execution circuit of the processor core is to cause the processor core to switch from the second mode to the first mode that only permits execution of the first instruction set architecture by the processor core; and
executing the decoded second single instruction by the execution circuit of the processor core according to the opcode.

Example 14. The method of example 9, wherein, when execution of the processor core is interrupted when in the modes, the execution is resumed only on another processor core of the plurality of processing cores that is a corresponding type for that mode.

Example 15. The method of example 9, wherein, when execution of the processor core is context switched when in the modes, the execution is resumed only on another processor core of the plurality of processing cores that is a corresponding type for that mode.

Example 16. The method of example 9, wherein the opcode indicates the execution circuit of the processor core is to raise an exception to steer execution to another processor core of the plurality of processing cores that is the requested core type when in the third mode or the fourth mode.

Example 17. A non-transitory machine readable medium that stores program code that when executed by a machine causes the machine to perform a method comprising:
decoding, by a decoder circuit of a processor core of a plurality of processor cores comprising a first type of processor core that supports a first instruction set architecture and a second type of processor core that supports a second different instruction set architecture, a single instruction into a decoded single instruction, the single instruction including a field that identifies a requested core type and an opcode that indicates an execution circuit of the processor core is to:
  read a register to determine a core type of the processor core,
  cause the processor core to enter a first mode, that only permits execution of the first instruction set architecture by the processor core, when the requested core type and the core type of the processor core are the first type,
  cause the processor core to enter a second mode, that only permits execution of the second different instruction set architecture by the processor core, when the requested core type and the core type of the processor core are the second type,
  cause the processor core to enter a third mode, that only permits execution of the first instruction set architecture by the processor core, when the requested core type is the second type and the core type of the processor core is the first type, and
  cause the processor core to enter a fourth mode, that only permits execution of the second different instruction set architecture by the processor core, when the requested core type is the first type and the core type of the processor core is the second type; and
executing the decoded single instruction by the execution circuit of the processor core according to the opcode.

Example 18. The non-transitory machine readable medium of example 17, wherein the opcode indicates the execution circuit of the processor core is to set a bit in a flag register to a first value when entering the first mode and the second mode, and to a second value when entering the third mode and the fourth mode.

Example 19. The non-transitory machine readable medium of example 17, wherein the second different instruction set architecture is the first instruction set architecture and one or more additional instructions not supported by the first type of processor core.

Example 20. The non-transitory machine readable medium of example 19, wherein, when execution of the processor core is interrupted when in the second mode, the execution is resumed only on another processor core of the plurality of processing cores that is the second type.

Example 21. The non-transitory machine readable medium of example 19, further comprising:

decoding a second single instruction by the decoder circuit of the processor core into a decoded second single instruction, the second single instruction including an opcode that indicates the execution circuit of the processor core is to cause the processor core to switch from the second mode to the first mode that only permits execution of the first instruction set architecture by the processor core; and executing the decoded second single instruction by the execution circuit of the processor core according to the opcode.

Example 22. The non-transitory machine readable medium of example 17, wherein, when execution of the processor core is interrupted when in the modes, the execution is resumed only on another processor core of the plurality of processing cores that is a corresponding type for that mode.

Example 23. The non-transitory machine readable medium of example 17, wherein, when execution of the processor core is context switched when in the modes, the execution is resumed only on another processor core of the plurality of processing cores that is a corresponding type for that mode.

Example 24. The non-transitory machine readable medium of example 17, wherein the opcode indicates the execution circuit of the processor core is to raise an exception to steer execution to another processor core of the plurality of processing cores that is the requested core type when in the third mode or the fourth mode.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 24A:
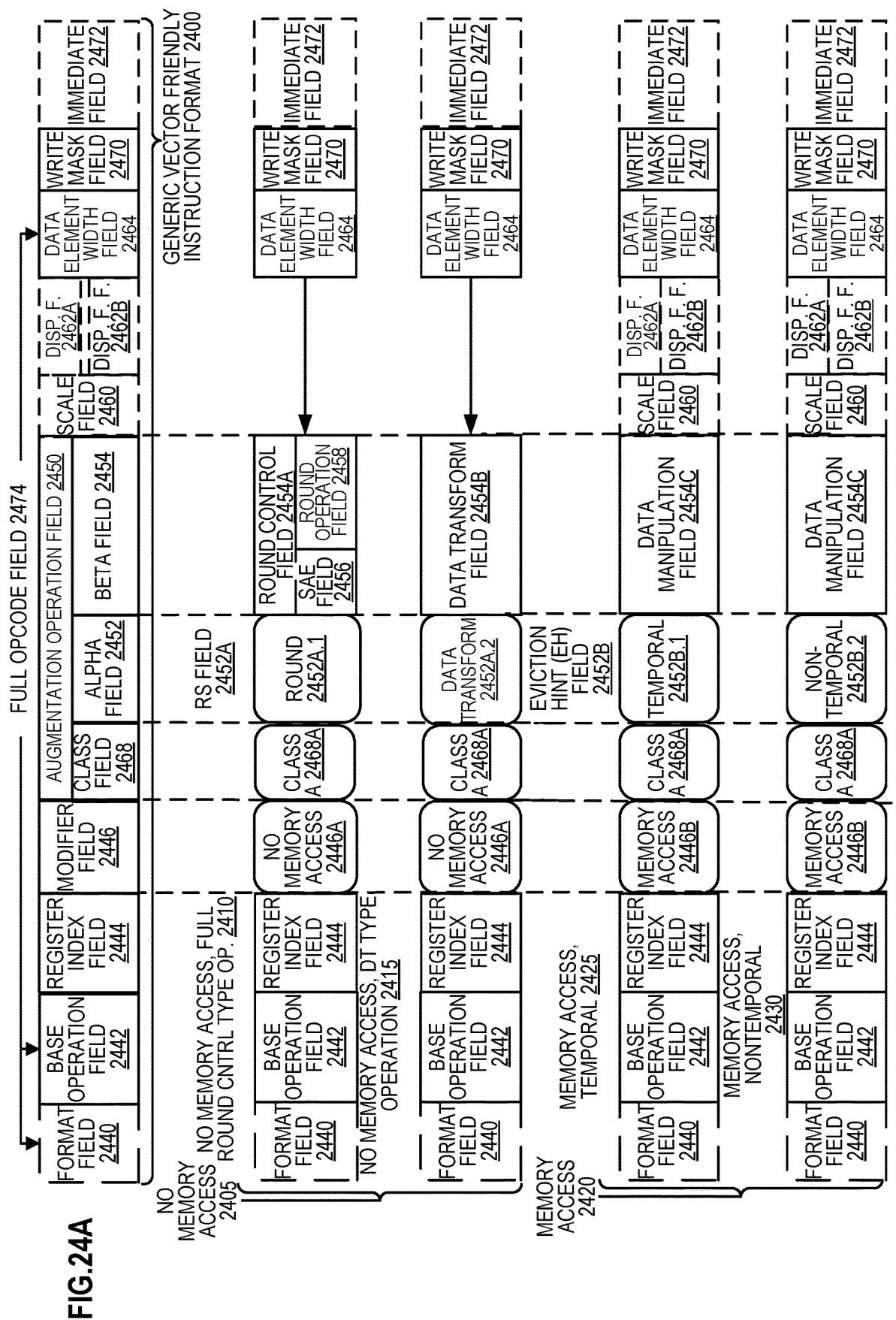
FIG. 24A is a block diagram illustrating a generic vector friendly instruction format and class A instruction templates thereof according to embodiments of the disclosure.
Figure 24B:
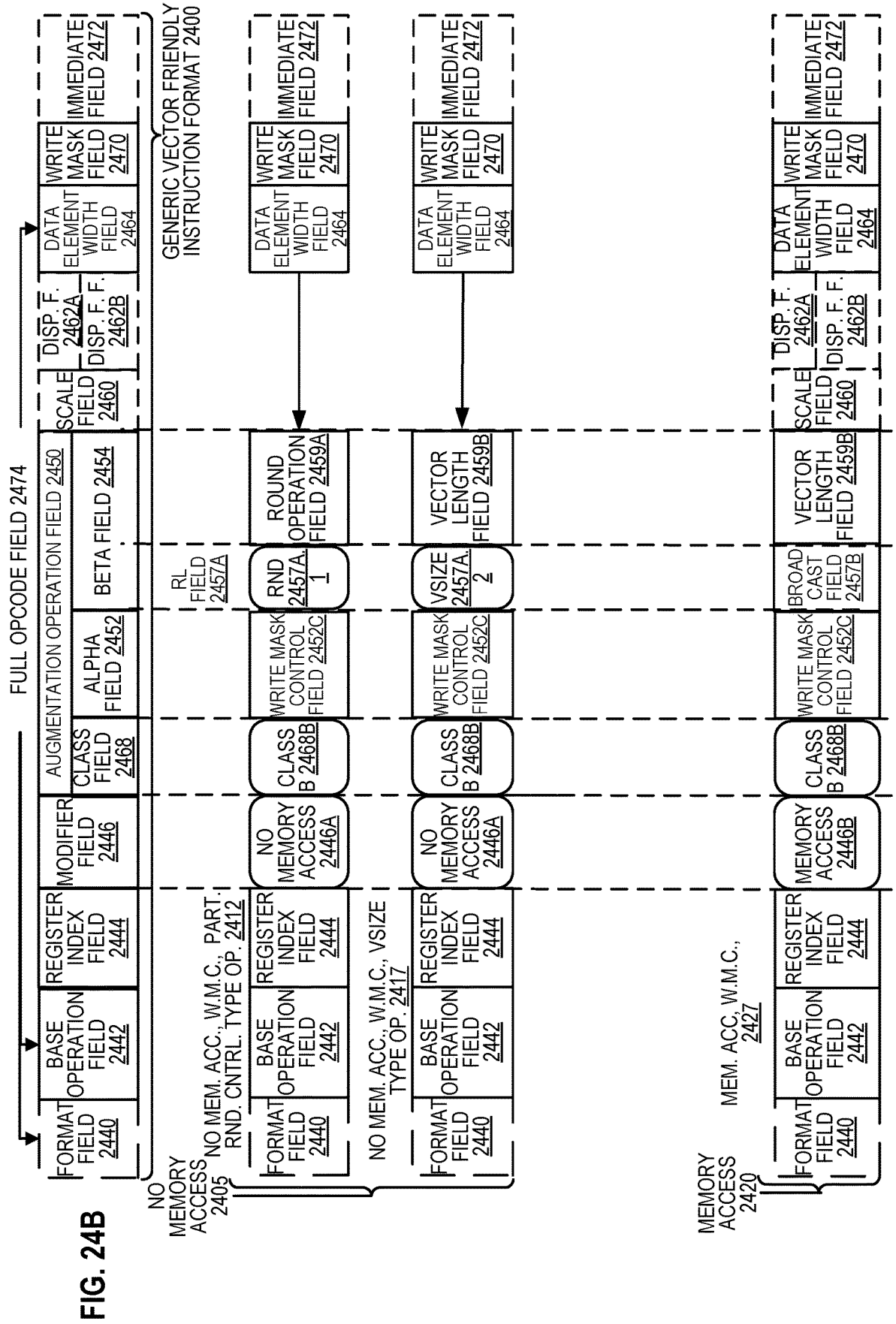
FIG. 24B is a block diagram illustrating the generic vector friendly instruction format and class B instruction templates thereof according to embodiments of the disclosure.

FIGS. 24A-24B are block diagrams illustrating a generic vector friendly instruction format and instruction templates thereof according to embodiments of the disclosure. FIG. 24A is a block diagram illustrating a generic vector friendly instruction format and class A instruction templates thereof according to embodiments of the disclosure; while FIG. 24B is a block diagram illustrating the generic vector friendly instruction format and class B instruction templates thereof according to embodiments of the disclosure. Specifically, a generic vector friendly instruction format 2400 for which are defined class A and class B instruction templates, both of which include no memory access 2405 instruction templates and memory access 2420 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 24A include: 1) within the no memory access 2405 instruction templates there is shown a no memory access, full round control type operation 2410 instruction template and a no memory access, data transform type operation 2415 instruction template; and 2) within the memory access 2420 instruction templates there is shown a memory access, temporal 2425 instruction template and a memory access, non-temporal 2430 instruction template. The class B instruction templates in FIG. 24B include: 1) within the no memory access 2405 instruction templates there is shown a no memory access, write mask control, partial round control type operation 2412 instruction template and a no memory access, write mask control, vsize type operation 2417 instruction template; and 2) within the memory access 2420 instruction templates there is shown a memory access, write mask control 2427 instruction template.

The generic vector friendly instruction format 2400 includes the following fields listed below in the order illustrated in FIGS. 24A-24B.

Format field 2440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2442—its content distinguishes different base operations.

Register index field 2444—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2446—its content distinguishes occurrences of instructions in the generic vector instruction format that specify memory access from those that do not; that is, between no memory access 2405 instruction templates and memory access 2420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2450—its content distinguishes which one of a variety of different operations to be performed in addition to the base operation. This field is context specific. In one embodiment of the disclosure, this field is divided into a class field 2468, an alpha field 2452, and a beta field 2454. The augmentation operation field 2450 allows common groups of operations to be performed in a single instruction rather than 2, 3, or 4 instructions.

Scale field 2460—its content allows for the scaling of the index field's content for memory address generation (e.g., for address generation that uses $2^{scale}*\text{index}+\text{base}$).

Displacement Field 2462A—its content is used as part of memory address generation (e.g., for address generation that uses $2^{scale}*\text{index}+\text{base}+\text{displacement}$).

Displacement Factor Field 2462B (note that the juxtaposition of displacement field 2462A directly over displacement factor field 2462B indicates one or the other is used) —its content is used as part of address generation; it specifies a displacement factor that is to be scaled by the size of a memory access (N) —where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2474 (described later herein) and the data manipulation field 2454C. The displacement field 2462A and the displacement factor field 2462B are optional in the sense that they are not used for the no memory access 2405 instruction templates and/or different embodiments may implement only one or none of the two.

Data element width field 2464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2470 allows for partial vector operations, including loads, stores, arithmetic, logical, etc. While embodiments of the disclosure are described in which the write mask field's 2470 content selects one of a number of write mask registers that contains the write mask to be used (and thus the write mask field's 2470 content indirectly identifies that masking to be performed), alternative embodiments instead or additional allow the mask write field's 2470 content to directly specify the masking to be performed.

Immediate field 2472—its content allows for the specification of an immediate. This field is optional in the sense that is it not present in an implementation of the generic vector friendly format that does not support immediate and it is not present in instructions that do not use an immediate.

Class field 2468—its content distinguishes between different classes of instructions. With reference to FIGS. 24A-B, the contents of this field select between class A and class B instructions. In FIGS. 24A-B, rounded corner squares are used to indicate a specific value is present in a field (e.g., class A 2468A and class B 2468B for the class field 2468 respectively in FIGS. 24A-B).

Instruction Templates of Class A

In the case of the non-memory access 2405 instruction templates of class A, the alpha field 2452 is interpreted as an RS field 2452A, whose content distinguishes which one of the different augmentation operation types are to be performed (e.g., round 2452A.1 and data transform 2452A.2 are respectively specified for the no memory access, round type operation 2410 and the no memory access, data transform type operation 2415 instruction templates), while the beta field 2454 distinguishes which of the operations of the specified type is to be performed. In the no memory access 2405 instruction templates, the scale field 2460, the displacement field 2462A, and the displacement scale filed 2462B are not present.

No-Memory Access Instruction Templates—Full Round Control Type Operation

In the no memory access full round control type operation 2410 instruction template, the beta field 2454 is interpreted as a round control field 2454A, whose content(s) provide static rounding. While in the described embodiments of the disclosure the round control field 2454A includes a suppress all floating-point exceptions (SAE) field 2456 and a round operation control field 2458, alternative embodiments may support may encode both these concepts into the same field or only have one or the other of these concepts/fields (e.g., may have only the round operation control field 2458).

SAE field 2456—its content distinguishes whether or not to disable the exception event reporting; when the SAE field's 2456 content indicates suppression is enabled, a given instruction does not report any kind of floating-point exception flag and does not raise any floating-point exception handler.

Round operation control field 2458—its content distinguishes which one of a group of rounding operations to perform (e.g., Round-up, Round-down, Round-towards-zero and Round-to-nearest). Thus, the round operation control field 2458 allows for the changing of the rounding mode on a per instruction basis. In one embodiment of the disclosure where a processor includes a control register for specifying rounding modes, the round operation control field's 2450 content overrides that register value.

No Memory Access Instruction Templates—Data Transform Type Operation

In the no memory access data transform type operation 2415 instruction template, the beta field 2454 is interpreted as a data transform field 2454B, whose content distinguishes which one of a number of data transforms is to be performed (e.g., no data transform, swizzle, broadcast).

In the case of a memory access 2420 instruction template of class A, the alpha field 2452 is interpreted as an eviction hint field 2452B, whose content distinguishes which one of the eviction hints is to be used (in FIG. 24A, temporal 2452B.1 and non-temporal 2452B.2 are respectively specified for the memory access, temporal 2425 instruction template and the memory access, non-temporal 2430 instruction template), while the beta field 2454 is interpreted as a data manipulation field 2454C, whose content distinguishes which one of a number of data manipulation operations (also known as primitives) is to be performed (e.g., no manipulation; broadcast; up conversion of a source; and down conversion of a destination). The memory access 2420 instruction templates include the scale field 2460, and optionally the displacement field 2462A or the displacement scale field 2462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2452 is interpreted as a write mask control (Z) field 2452C, whose content distinguishes whether the write masking controlled by the write mask field 2470 should be a merging or a zeroing.

In the case of the non-memory access 2405 instruction templates of class B, part of the beta field 2454 is interpreted as an RL field 2457A, whose content distinguishes which one of the different augmentation operation types are to be performed (e.g., round 2457A.1 and vector length (VSIZE) 2457A.2 are respectively specified for the no memory access, write mask control, partial round control type operation 2412 instruction template and the no memory access, write mask control, VSIZE type operation 2417 instruction template), while the rest of the beta field 2454 distinguishes which of the operations of the specified type is to be performed. In the no memory access 2405 instruction templates, the scale field 2460, the displacement field 2462A, and the displacement scale filed 2462B are not present.

In the no memory access, write mask control, partial round control type operation 2410 instruction template, the rest of the beta field 2454 is interpreted as a round operation field 2459A and exception event reporting is disabled (a given instruction does not report any kind of floating-point exception flag and does not raise any floating-point exception handler).

Round operation control field 2459A—just as round operation control field 2458, its content distinguishes which one of a group of rounding operations to perform (e.g., Round-up, Round-down, Round-towards-zero and Round-to-nearest). Thus, the round operation control field 2459A allows for the changing of the rounding mode on a per instruction basis. In one embodiment of the disclosure where a processor includes a control register for specifying rounding modes, the round operation control field's 2450 content overrides that register value.

In the no memory access, write mask control, VSIZE type operation 2417 instruction template, the rest of the beta field 2454 is interpreted as a vector length field 2459B, whose content distinguishes which one of a number of data vector lengths is to be performed on (e.g., 128, 256, or 512 byte).

In the case of a memory access 2420 instruction template of class B, part of the beta field 2454 is interpreted as a broadcast field 2457B, whose content distinguishes whether or not the broadcast type data manipulation operation is to be performed, while the rest of the beta field 2454 is interpreted the vector length field 2459B. The memory access 2420 instruction templates include the scale field 2460, and optionally the displacement field 2462A or the displacement scale field 2462B.

With regard to the generic vector friendly instruction format 2400, a full opcode field 2474 is shown including the format field 2440, the base operation field 2442, and the data element width field 2464. While one embodiment is shown where the full opcode field 2474 includes all of these fields, the full opcode field 2474 includes less than all of these fields in embodiments that do not support all of them. The full opcode field 2474 provides the operation code (opcode).

The augmentation operation field 2450, the data element width field 2464, and the write mask field 2470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 25 is a block diagram illustrating an exemplary specific vector friendly instruction format according to embodiments of the disclosure. FIG. 25 shows a specific vector friendly instruction format 2500 that is specific in the sense that it specifies the location, size, interpretation, and order of the fields, as well as values for some of those fields. The specific vector friendly instruction format 2500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 24 into which the fields from FIG. 25 map are illustrated.

It should be understood that, although embodiments of the disclosure are described with reference to the specific vector friendly instruction format 2500 in the context of the generic vector friendly instruction format 2400 for illustrative purposes, the disclosure is not limited to the specific vector friendly instruction format 2500 except where claimed. For example, the generic vector friendly instruction format 2400 contemplates a variety of possible sizes for the various fields, while the specific vector friendly instruction format 2500 is shown as having fields of specific sizes. By way of specific example, while the data element width field 2464 is illustrated as a one bit field in the specific vector friendly instruction format 2500, the disclosure is not so limited (that is, the generic vector friendly instruction format 2400 contemplates other sizes of the data element width field 2464).

The generic vector friendly instruction format 2400 includes the following fields listed below in the order illustrated in FIG. 25A.

EVEX Prefix (Bytes 0-3) 2502—is encoded in a four-byte form.

Format Field 2440 (EVEX Byte 0, bits [7:0])—the first byte (EVEX Byte 0) is the format field 2440 and it contains 0x62 (the unique value used for distinguishing the vector friendly instruction format in one embodiment of the disclosure).

The second-fourth bytes (EVEX Bytes 1-3) include a number of bit fields providing specific capability.

REX field 2505 (EVEX Byte 1, bits [7-5])—consists of an EVEX.R bit field (EVEX Byte 1, bit [7]-R), EVEX.X bit field (EVEX byte 1, bit [6]-X), and 2457BEX byte 1, bit[5]-B). The EVEX.R, EVEX.X, and EVEX.B bit fields provide the same functionality as the corresponding VEX bit fields, and are encoded using 1s complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2410—this is the first part of the REX' field 2410 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2515 (EVEX byte 1, bits [3:0]-mmmm)—its content encodes an implied leading opcode byte (0F, 0F 38, or 0F 3).

Data element width field 2464 (EVEX byte 2, bit [7]-W)—is represented by the notation EVEX.W. EVEX.W is used to define the granularity (size) of the datatype (either 32-bit data elements or 64-bit data elements).

EVEX.vvvv 2520 (EVEX Byte 2, bits [6:3]-vvvv)—the role of EVEX.vvvv may include the following: 1) EVEX.vvvv encodes the first source register operand, specified in inverted (is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 111 lb. Thus, EVEX.vvvv field 2520 encodes the 4 low-order bits of the first source register specifier stored in inverted (is complement) form. Depending on the instruction, an extra different EVEX bit field is used to extend the specifier size to 32 registers.

EVEX.U 2468 Class field (EVEX byte 2, bit [2]-U)—If EVEX.U=0, it indicates class A or EVEX.U0; if EVEX.U=1, it indicates class B or EVEX.U1.

Prefix encoding field 2525 (EVEX byte 2, bits [1:0]-pp) —provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2452 (EVEX byte 3, bit [7]-EH; also known as EVEX.EH, EVEX.rs, EVEX.RL, EVEX.write mask control, and EVEX.N; also illustrated with a) —as previously described, this field is context specific.

Beta field 2454 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ) —as previously described, this field is context specific.

REX' field 2410—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2470 (EVEX byte 3, bits [2:0]-kkk) —its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2530 (Byte 4) is also known as the opcode byte. Part of the opcode is specified in this field.

MOD R/M Field 2540 (Byte 5) includes MOD field 2542, Reg field 2544, and R/M field 2546. As previously described, the MOD field's 2542 content distinguishes between memory access and non-memory access operations. The role of Reg field 2544 can be summarized to two situations: encoding either the destination register operand or a source register operand, or be treated as an opcode extension and not used to encode any instruction operand. The role of R/M field 2546 may include the following: encoding the instruction operand that references a memory address, or encoding either the destination register operand or a source register operand.

Scale, Index, Base (SIB) Byte (Byte 6) —As previously described, the scale field's 2450 content is used for memory address generation. SIB.xxx 2554 and SIB.bbb 2556—the contents of these fields have been previously referred to with regard to the register indexes Xxxx and Bbbb.

Displacement field 2462A (Bytes 7-10) —when MOD field 2542 contains 10, bytes 7-10 are the displacement field 2462A, and it works the same as the legacy 32-bit displacement (disp32) and works at byte granularity.

Displacement factor field 2462B (Byte 7) —when MOD field 2542 contains 01, byte 7 is the displacement factor field 2462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2462B is a reinterpretation of disp8; when using displacement factor field 2462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2462B substitutes the legacy x86 instruction set 8-bit displacement. Thus, the displacement factor field 2462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2472 operates as previously described.

Full Opcode Field

FIG. 25B is a block diagram illustrating the fields of the specific vector friendly instruction format 2500 that make up the full opcode field 2474 according to one embodiment of the disclosure. Specifically, the full opcode field 2474 includes the format field 2440, the base operation field 2442, and the data element width (W) field 2464. The base operation field 2442 includes the prefix encoding field 2525, the opcode map field 2515, and the real opcode field 2530.

Register Index Field

FIG. 25C is a block diagram illustrating the fields of the specific vector friendly instruction format 2500 that make up the register index field 2444 according to one embodiment of the disclosure. Specifically, the register index field 2444 includes the REX field 2505, the REX' field 2510, the MODR/M.reg field 2544, the MODR/M.r/m field 2546, the VVVV field 2520, xxx field 2554, and the bbb field 2556.

Augmentation Operation Field

Figure 25D:
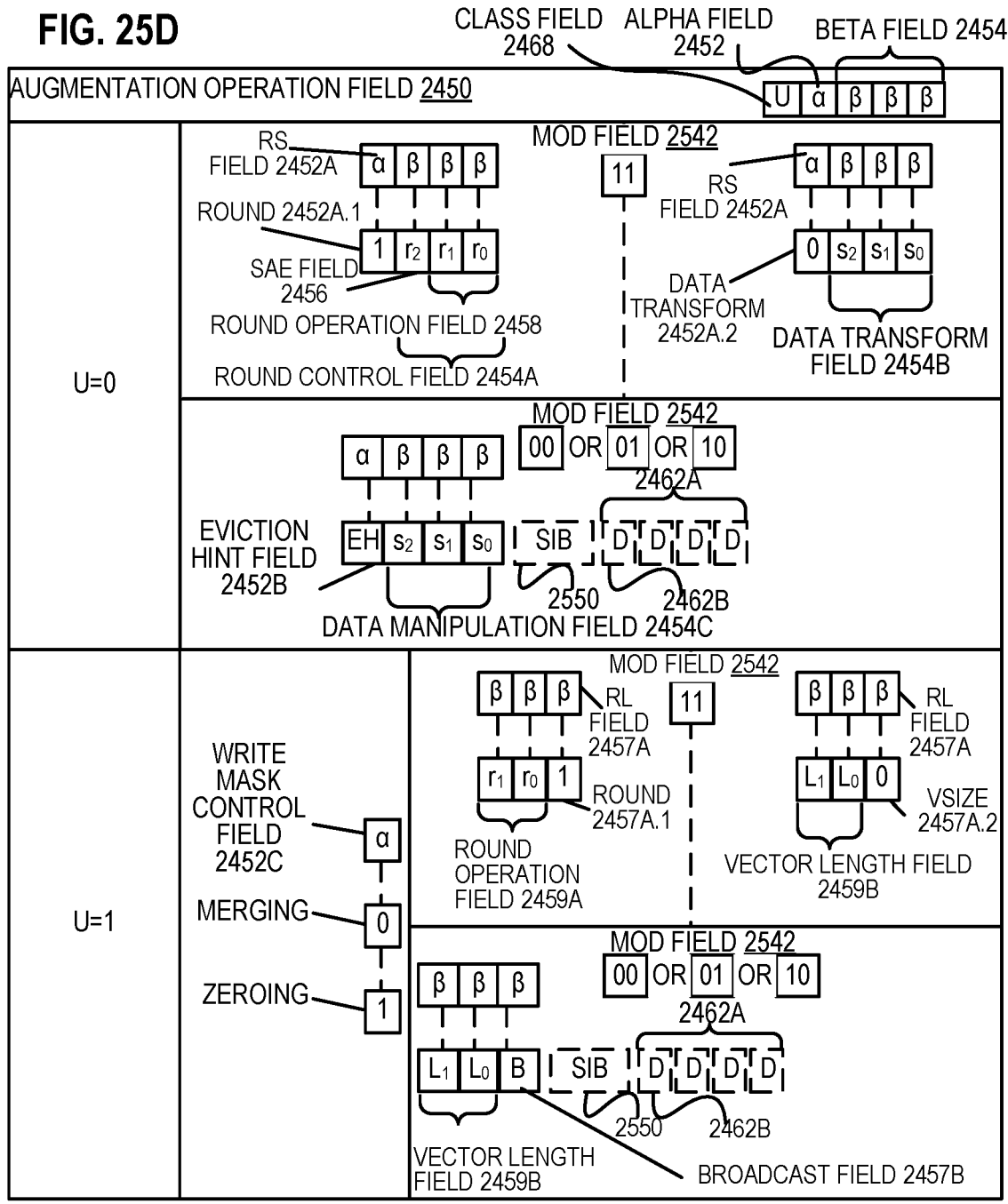
FIG. 25D is a block diagram illustrating the fields of the specific vector friendly instruction format in FIG. 25A that make up the augmentation operation field 2450 according to one embodiment of the disclosure.

FIG. 25D is a block diagram illustrating the fields of the specific vector friendly instruction format 2500 that make up the augmentation operation field 2450 according to one embodiment of the disclosure. When the class (U) field 2468 contains 0, it signifies EVEX.U0 (class A 2468A); when it contains 1, it signifies EVEX.U1 (class B 2468B). When U=0 and the MOD field 2542 contains 11 (signifying a no memory access operation), the alpha field 2452 (EVEX byte 3, bit [7]-EH) is interpreted as the rs field 2452A. When the rs field 2452A contains a 1 (round 2452A.1), the beta field 2454 (EVEX byte 3, bits [6:4]-SSS) is interpreted as the round control field 2454A. The round control field 2454A includes a one bit SAE field 2456 and a two bit round operation field 2458. When the rs field 2452A contains a 0 (data transform 2452A.2), the beta field 2454 (EVEX byte 3, bits [6:4]-SSS) is interpreted as a three bit data transform field 2454B. When U=0 and the MOD field 2542 contains 00, 01, or 10 (signifying a memory access operation), the alpha field 2452 (EVEX byte 3, bit [7]-EH) is interpreted as the eviction hint (EH) field 2452B and the beta field 2454 (EVEX byte 3, bits [6:4]-SSS) is interpreted as a three bit data manipulation field 2454C.

When U=1, the alpha field 2452 (EVEX byte 3, bit [7]-EH) is interpreted as the write mask control (Z) field 2452C. When U=1 and the MOD field 2542 contains 11 (signifying a no memory access operation), part of the beta field 2454 (EVEX byte 3, bit [4]-$S_0$) is interpreted as the RL field 2457A; when it contains a 1 (round 2457A.1) the rest of the beta field 2454 (EVEX byte 3, bit [6-5]-$S_{2-1}$) is interpreted as the round operation field 2459A, while when the RL field 2457A contains a 0 (VSIZE 2457.A2) the rest of the beta field 2454 (EVEX byte 3, bit [6-5]-$S_{2-1}$) is interpreted as the vector length field 2459B (EVEX byte 3, bit [6-5]-$L_{1-0}$). When U=1 and the MOD field 2542 contains 00, 01, or 10 (signifying a memory access operation), the beta field 2454 (EVEX byte 3, bits [6:4]-SSS) is interpreted as the vector length field 2459B (EVEX byte 3, bit [6-5]-$L_{1-0}$) and the broadcast field 2457B (EVEX byte 3, bit [4]-B).

Exemplary Register Architecture

Figure 26:
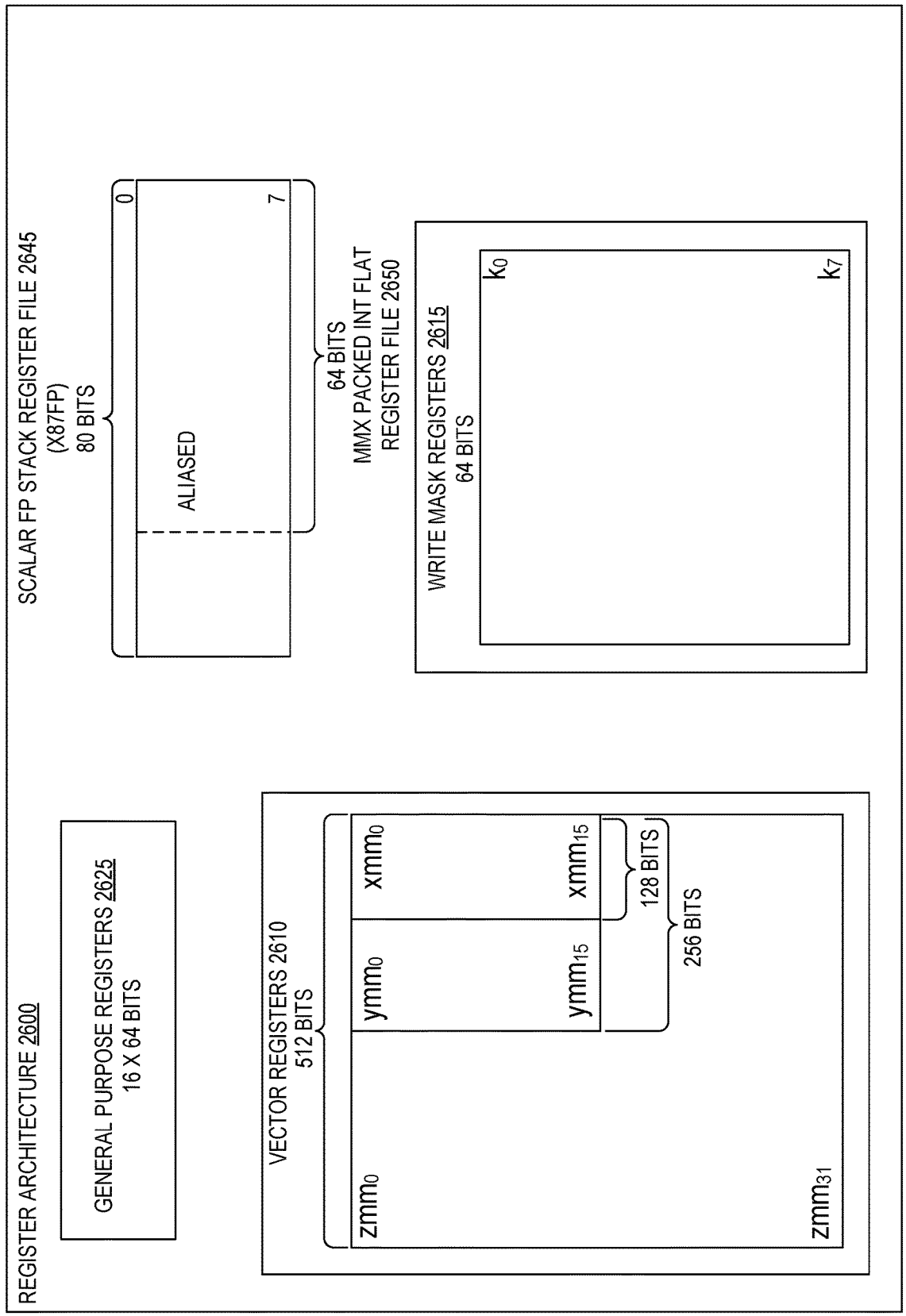
FIG. 26 is a block diagram of a register architecture according to one embodiment of the disclosure.

FIG. 26 is a block diagram of a register architecture 2600 according to one embodiment of the disclosure. In the embodiment illustrated, there are 32 vector registers 2610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2500 operates on these overlaid register file as illustrated in the below tables.

| Adjustable Vector Length | Class | Operations | Registers |
| --- | --- | --- | --- |
| Instruction Templates that do not include the vector length field 2459B | A (FIG. 24A; U = 0) B (FIG. 24B; U = 1) | 2410, 2415, 2425, 2430 2412 | zmm registers (the vector length is 64 byte) zmm registers (the vector length is 64 byte) |
| Instruction templates that do include the vector length field 2459B | B (FIG. 24B; U = 1) | 2417, 2427 | zmm, ymm, or xmm registers (the vector length is 64 byte, 32 byte, or 16 byte) depending on the vector length field 2459B |

In other words, the vector length field 2459B selects between a maximum length and one or more other shorter lengths, where each such shorter length is half the length of the preceding length; and instructions templates without the vector length field 2459B operate on the maximum vector length. Further, in one embodiment, the class B instruction templates of the specific vector friendly instruction format 2500 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 2615—in the embodiment illustrated, there are 8 write mask registers (k0 through k7), each 64 bits in size. In an alternate embodiment, the write mask registers 2615 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 2625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2645, on which is aliased the MMX packed integer flat register file 2650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 27A:
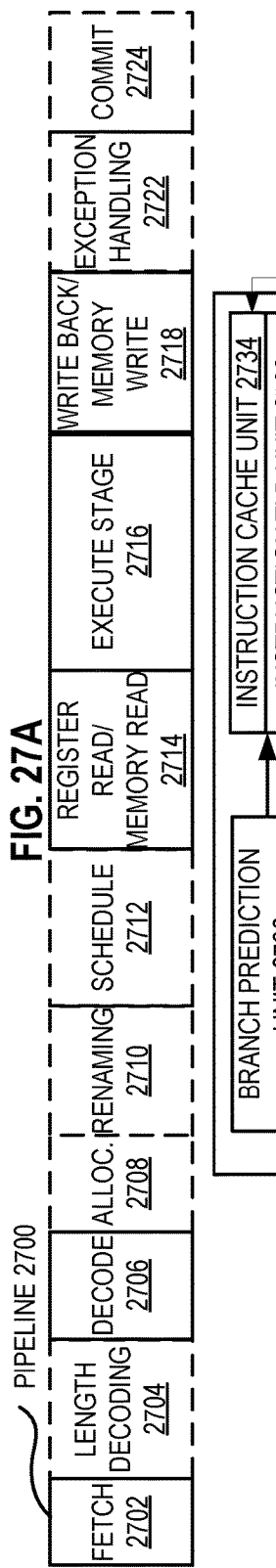
FIG. 27A is a block diagram illustrating both an exemplary in-order pipeline and an exemplary register renaming, out-of-order issue/execution pipeline according to embodiments of the disclosure.
Figure 27B:
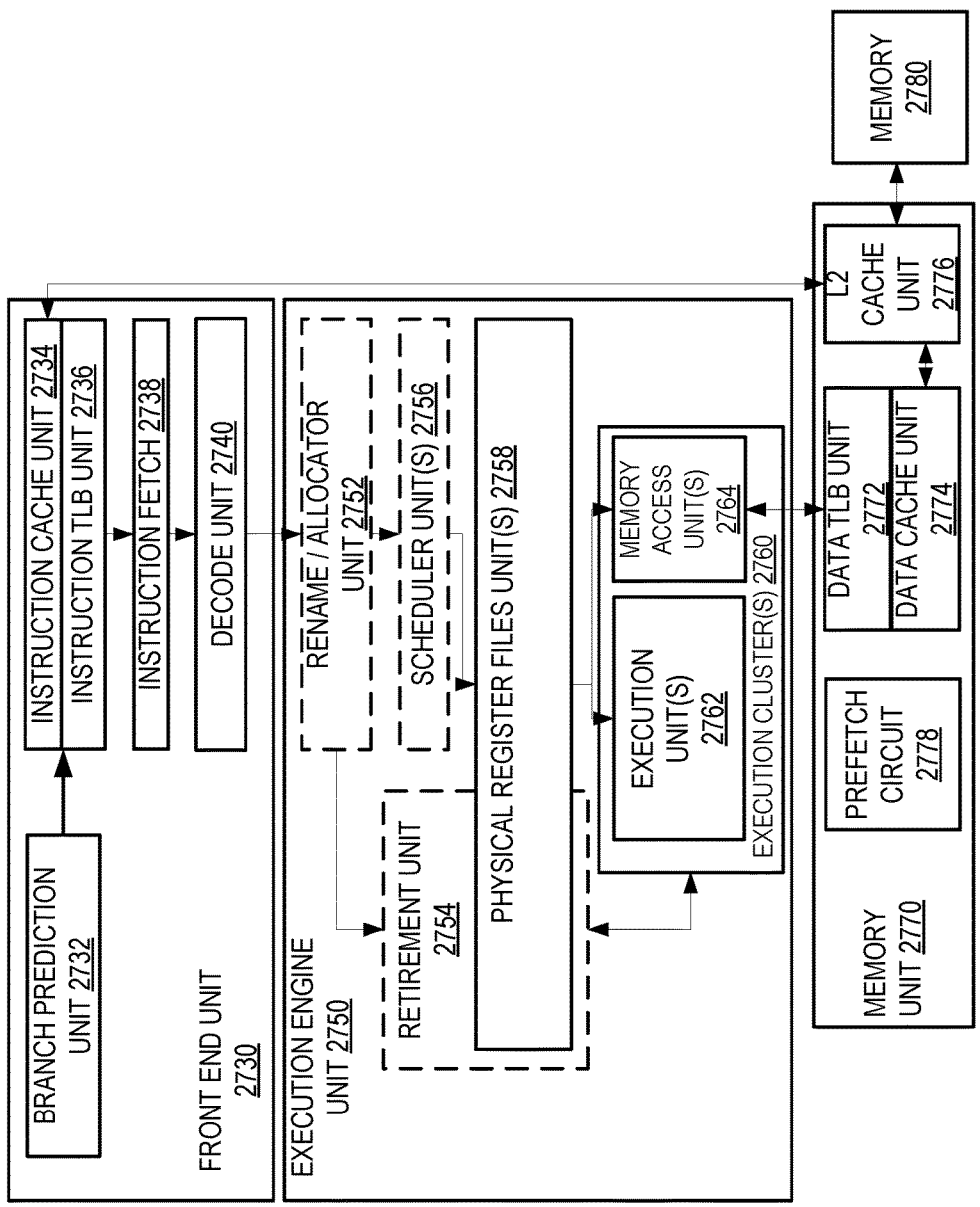
FIG. 27B is a block diagram illustrating both an exemplary embodiment of an in-order architecture core and an exemplary register renaming, out-of-order issue/execution architecture core to be included in a processor according to embodiments of the disclosure.

FIG. 27A is a block diagram illustrating both an exemplary in-order pipeline and an exemplary register renaming, out-of-order issue/execution pipeline according to embodiments of the disclosure. FIG. 27B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 27A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 27A, a processor pipeline 2700 includes a fetch stage 2702, a length decode stage 2704, a decode stage 2706, an allocation stage 2708, a renaming stage 2710, a scheduling (also known as a dispatch or issue) stage 2712, a register read/memory read stage 2714, an execute stage 2716, a write back/memory write stage 2718, an exception handling stage 2722, and a commit stage 2724.

FIG. 27B shows processor core 2790 including a front-end unit 2730 coupled to an execution engine unit 2750, and both are coupled to a memory unit 2770. The core 2790 may be a reduced instruction set computing (RISC) core, a complex instruction set computing (CISC) core, a very long instruction word (VLIW) core, or a hybrid or alternative core type. As yet another option, the core 2790 may be a special-purpose core, such as, for example, a network or communication core, compression engine, coprocessor core, general purpose computing graphics processing unit (GPGPU) core, graphics core, or the like.

The front-end unit 2730 includes a branch prediction unit 2732 coupled to an instruction cache unit 2734, which is coupled to an instruction translation lookaside buffer (TLB) 2736, which is coupled to an instruction fetch unit 2738, which is coupled to a decode unit 2740. The decode unit 2740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2790 includes a microcode ROM or other medium that stores microcode for certain macro-instructions (e.g., in decode unit 2740 or otherwise within the front-end unit 2730). The decode unit 2740 is coupled to a rename/allocator unit 2752 in the execution engine unit 2750.

The execution engine unit 2750 includes the rename/allocator unit 2752 coupled to a retirement unit 2754 and a set of one or more scheduler unit(s) 2756. The scheduler unit(s) 2756 represents any number of different schedulers, including reservations stations, central instruction window, etc. The scheduler unit(s) 2756 is coupled to the physical register file(s) unit(s) 2758. Each of the physical register file(s) units 2758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2758 comprises a vector registers unit, a write mask registers unit, and a scalar registers unit. These register units may provide architectural vector registers, vector mask registers, and general-purpose registers. The physical register file(s) unit(s) 2758 is overlapped by the retirement unit 2754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2754 and the physical register file(s) unit(s) 2758 are coupled to the execution cluster(s) 2760. The execution cluster(s) 2760 includes a set of one or more execution units 2762 and a set of one or more memory access units 2764. The execution units 2762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2756, physical register file(s) unit(s) 2758, and execution cluster(s) 2760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2764). It should also be understood that where separate pipelines are used, one or more of these pipelines may be out-of-order issue/execution and the rest in-order.

The set of memory access units 2764 is coupled to the memory unit 2770, which includes a data TLB unit 2772 coupled to a data cache unit 2774 coupled to a level 2 (L2) cache unit 2776. In one exemplary embodiment, the memory access units 2764 may include a load unit, a store address unit, and a store data unit, each of which is coupled to the data TLB unit 2772 in the memory unit 2770. The instruction cache unit 2734 is further coupled to a level 2 (L2) cache unit 2776 in the memory unit 2770. The L2 cache unit 2776 is coupled to one or more other levels of cache and eventually to a main memory.

In certain embodiments, a prefetch circuit 2778 is included to prefetch data, for example, to predict access addresses and bring the data for those addresses into a cache or caches (e.g., from memory 2780).

By way of example, the exemplary register renaming, out-of-order issue/execution core architecture may implement the pipeline 2700 as follows: 1) the instruction fetch 2738 performs the fetch and length decoding stages 2702 and 2704; 2) the decode unit 2740 performs the decode stage 2706; 3) the rename/allocator unit 2752 performs the allocation stage 2708 and renaming stage 2710; 4) the scheduler unit(s) 2756 performs the schedule stage 2712; 5) the physical register file(s) unit(s) 2758 and the memory unit 2770 perform the register read/memory read stage 2714; the execution cluster 2760 perform the execute stage 2716; 6) the memory unit 2770 and the physical register file(s) unit(s) 2758 perform the write back/memory write stage 2718; 7) various units may be involved in the exception handling stage 2722; and 8) the retirement unit 2754 and the physical register file(s) unit(s) 2758 perform the commit stage 2724.

The core 2790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 2790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 2734/2774 and a shared L2 cache unit 2776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 28B:
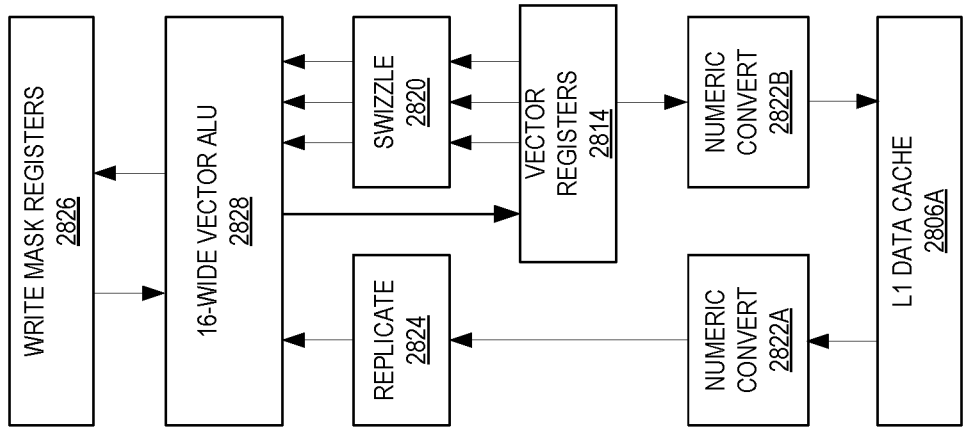
FIG. 28B is an expanded view of part of the processor core in FIG. 28A according to embodiments of the disclosure.
Figure 28A:
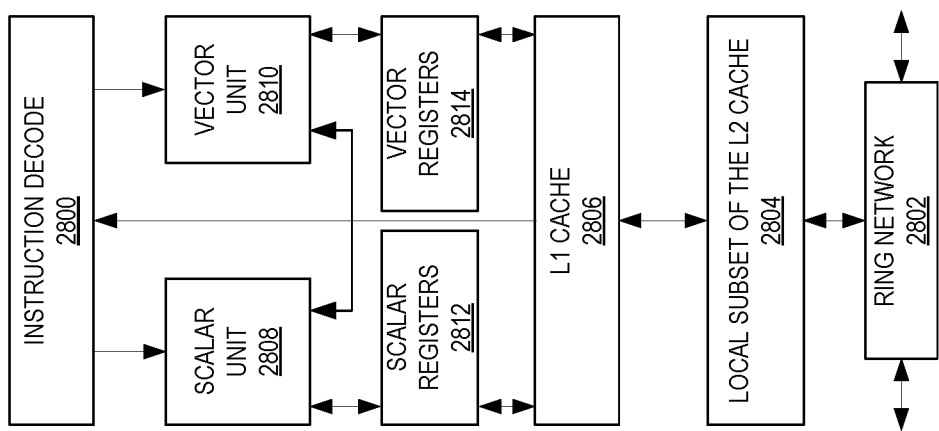
FIG. 28A is a block diagram of a single processor core, along with its connection to the on-die interconnect network and with its local subset of the Level 2 (L2) cache, according to embodiments of the disclosure.

FIGS. 28A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 28A is a block diagram of a single processor core, along with its connection to the on-die interconnect network 2802 and with its local subset of the Level 2 (L2) cache 2804, according to embodiments of the disclosure. In one embodiment, an instruction decode unit 2800 supports the x86 instruction set with a packed data instruction set extension. An L1 cache 2806 allows low-latency accesses to cache memory into the scalar and vector units. While in one embodiment (to simplify the design), a scalar unit 2808 and a vector unit 2810 use separate register sets (respectively, scalar registers 2812 and vector registers 2814) and data transferred between them is written to memory and then read back in from a level 1 (L1) cache 2806, alternative embodiments of the disclosure may use a different approach (e.g., use a single register set or include a communication path that allow data to be transferred between the two register files without being written and read back).

The local subset of the L2 cache 2804 is part of a global L2 cache that is divided into separate local subsets, one per processor core. Each processor core has a direct access path to its own local subset of the L2 cache 2804. Data read by a processor core is stored in its L2 cache subset 2804 and can be accessed quickly, in parallel with other processor cores accessing their own local L2 cache subsets. Data written by a processor core is stored in its own L2 cache subset 2804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 28B is an expanded view of part of the processor core in FIG. 28A according to embodiments of the disclosure. FIG. 28B includes an L1 data cache 2806A part of the L1 cache 2804, as well as more detail regarding the vector unit 2810 and the vector registers 2814. Specifically, the vector unit 2810 is a 16-wide vector processing unit (VPU) (see the 16-wide ALU 2828), which executes one or more of integer, single-precision float, and double-precision float instructions. The VPU supports swizzling the register inputs with swizzle unit 2820, numeric conversion with numeric convert units 2822A-B, and replication with replication unit 2824 on the memory input. Write mask registers 2826 allow predicating resulting vector writes.

Figure 29:
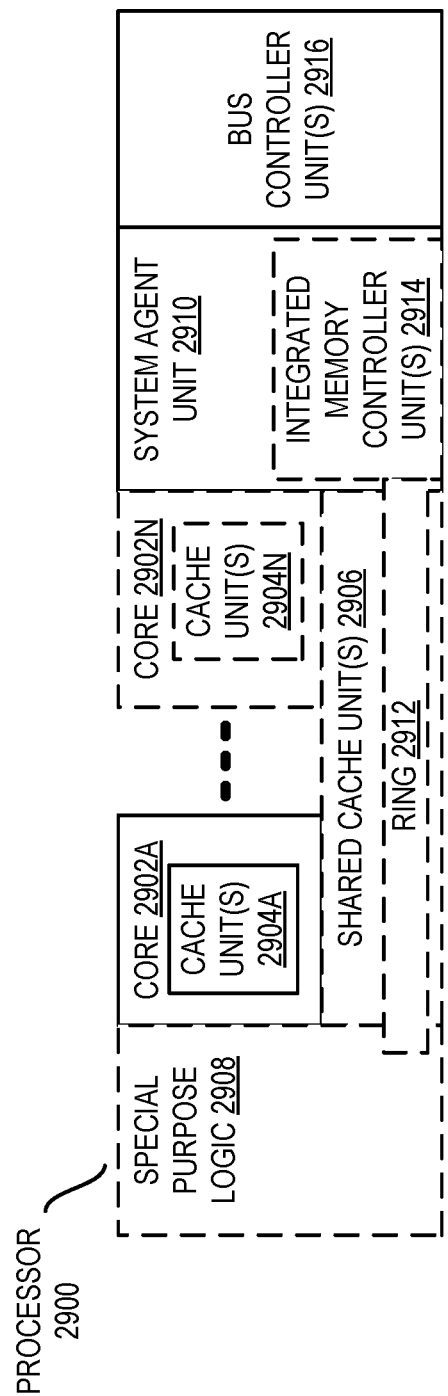
FIG. 29 is a block diagram of a processor that may have more than one core, may have an integrated memory controller, and may have integrated graphics according to embodiments of the disclosure.

FIG. 29 is a block diagram of a processor 2900 that may have more than one core, may have an integrated memory controller, and may have integrated graphics according to embodiments of the disclosure. The solid lined boxes in FIG. 29 illustrate a processor 2900 with a single core 2902A, a system agent 2910, a set of one or more bus controller units 2916, while the optional addition of the dashed lined boxes illustrates an alternative processor 2900 with multiple cores 2902A-N, a set of one or more integrated memory controller unit(s) 2914 in the system agent unit 2910, and special purpose logic 2908.

Thus, different implementations of the processor 2900 may include: 1) a CPU with the special purpose logic 2908 being integrated graphics and/or scientific (throughput) logic (which may include one or more cores), and the cores 2902A-N being one or more general purpose cores (e.g., general purpose in-order cores, general purpose out-of-order cores, a combination of the two); 2) a coprocessor with the cores 2902A-N being a large number of special purpose cores intended primarily for graphics and/or scientific (throughput); and 3) a coprocessor with the cores 2902A-N being a large number of general purpose in-order cores. Thus, the processor 2900 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2906, and external memory (not shown) coupled to the set of integrated memory controller units 2914. The set of shared cache units 2906 may include one or more mid-level caches, such as level 2 (L2), level 3 (L3), level 4 (L4), or other levels of cache, a last level cache (LLC), and/or combinations thereof. While in one embodiment a ring-based interconnect unit 2912 interconnects the integrated graphics logic 2908, the set of shared cache units 2906, and the system agent unit 2910/integrated memory controller unit(s) 2914, alternative embodiments may use any number of well-known techniques for interconnecting such units. In one embodiment, coherency is maintained between one or more cache units 2906 and cores 2902-A-N.

In some embodiments, one or more of the cores 2902A-N are capable of multithreading. The system agent 2910 includes those components coordinating and operating cores 2902A-N. The system agent unit 2910 may include for example a power control unit (PCU) and a display unit. The PCU may be or include logic and components needed for regulating the power state of the cores 2902A-N and the integrated graphics logic 2908. The display unit is for driving one or more externally connected displays.

The cores 2902A-N may be homogenous or heterogeneous in terms of architecture instruction set; that is, two or more of the cores 2902A-N may be capable of execution the same instruction set, while others may be capable of executing only a subset of that instruction set or a different instruction set.

Exemplary Computer Architectures

FIGS. 30-33 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 30:
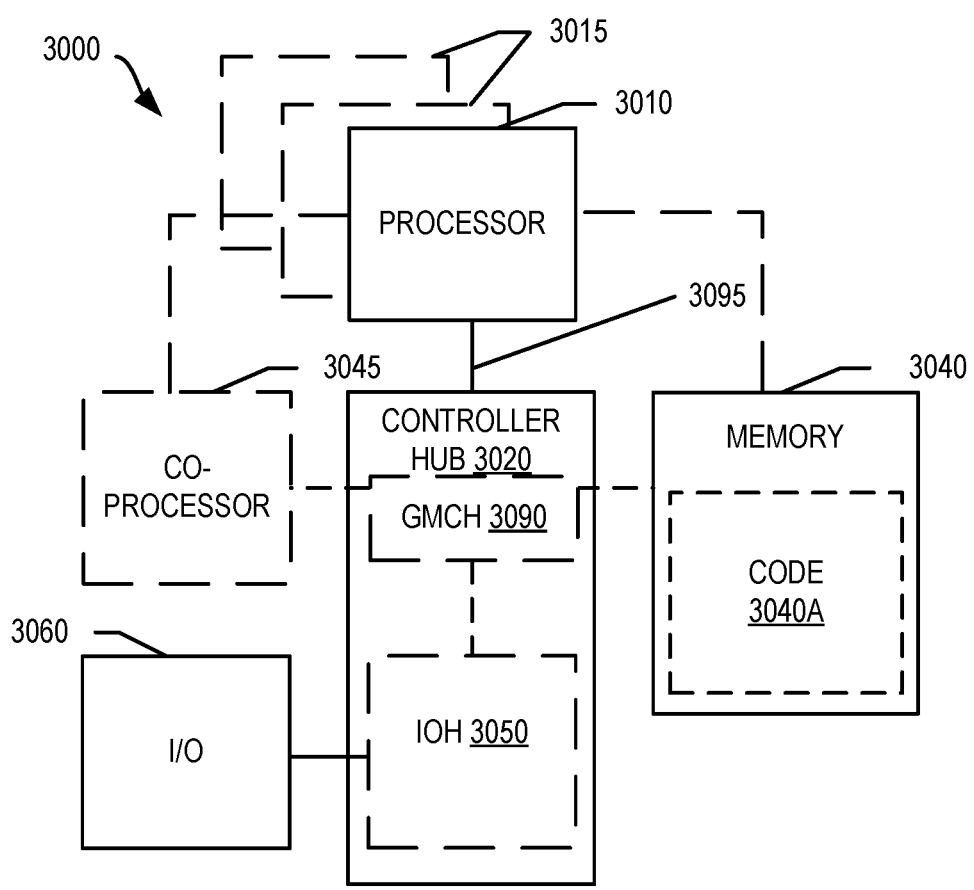
FIG. 30 is a block diagram of a system in accordance with one embodiment of the present disclosure.

Referring now to FIG. 30, shown is a block diagram of a system 3000 in accordance with one embodiment of the present disclosure. The system 3000 may include one or more processors 3010, 3015, which are coupled to a controller hub 3020. In one embodiment the controller hub 3020 includes a graphics memory controller hub (GMCH) 3090 and an Input/Output Hub (IOH) 3050 (which may be on separate chips); the GMCH 3090 includes memory and graphics controllers to which are coupled memory 3040 and a coprocessor 3045; the IOH 3050 is couples input/output (I/O) devices 3060 to the GMCH 3090. Alternatively, one or both of the memory and graphics controllers are integrated within the processor (as described herein), the memory 3040 and the coprocessor 3045 are coupled directly to the processor 3010, and the controller hub 3020 in a single chip with the IOH 3050. Memory 3040 may include code 3040A, for example, that when executed causes a processor to perform any method of this disclosure.

The optional nature of additional processors 3015 is denoted in FIG. 30 with broken lines. Each processor 3010, 3015 may include one or more of the processing cores described herein and may be some version of the processor 2900.

The memory 3040 may be, for example, dynamic random access memory (DRAM), phase change memory (PCM), or a combination of the two. For at least one embodiment, the controller hub 3020 communicates with the processor(s) 3010, 3015 via a multi-drop bus, such as a frontside bus (FSB), point-to-point interface such as Quickpath Interconnect (QPI), or similar connection 3095.

In one embodiment, the coprocessor 3045 is a special-purpose processor, such as, for example, a high-throughput MIC processor, a network or communication processor, compression engine, graphics processor, GPGPU, embedded processor, or the like. In one embodiment, controller hub 3020 may include an integrated graphics accelerator.

There can be a variety of differences between the physical resources 3010, 3015 in terms of a spectrum of metrics of merit including architectural, microarchitectural, thermal, power consumption characteristics, and the like.

In one embodiment, the processor 3010 executes instructions that control data processing operations of a general type. Embedded within the instructions may be coprocessor instructions. The processor 3010 recognizes these coprocessor instructions as being of a type that should be executed by the attached coprocessor 3045. Accordingly, the processor 3010 issues these coprocessor instructions (or control signals representing coprocessor instructions) on a coprocessor bus or other interconnect, to coprocessor 3045. Coprocessor (s) 3045 accept and execute the received coprocessor instructions.

Figure 31:
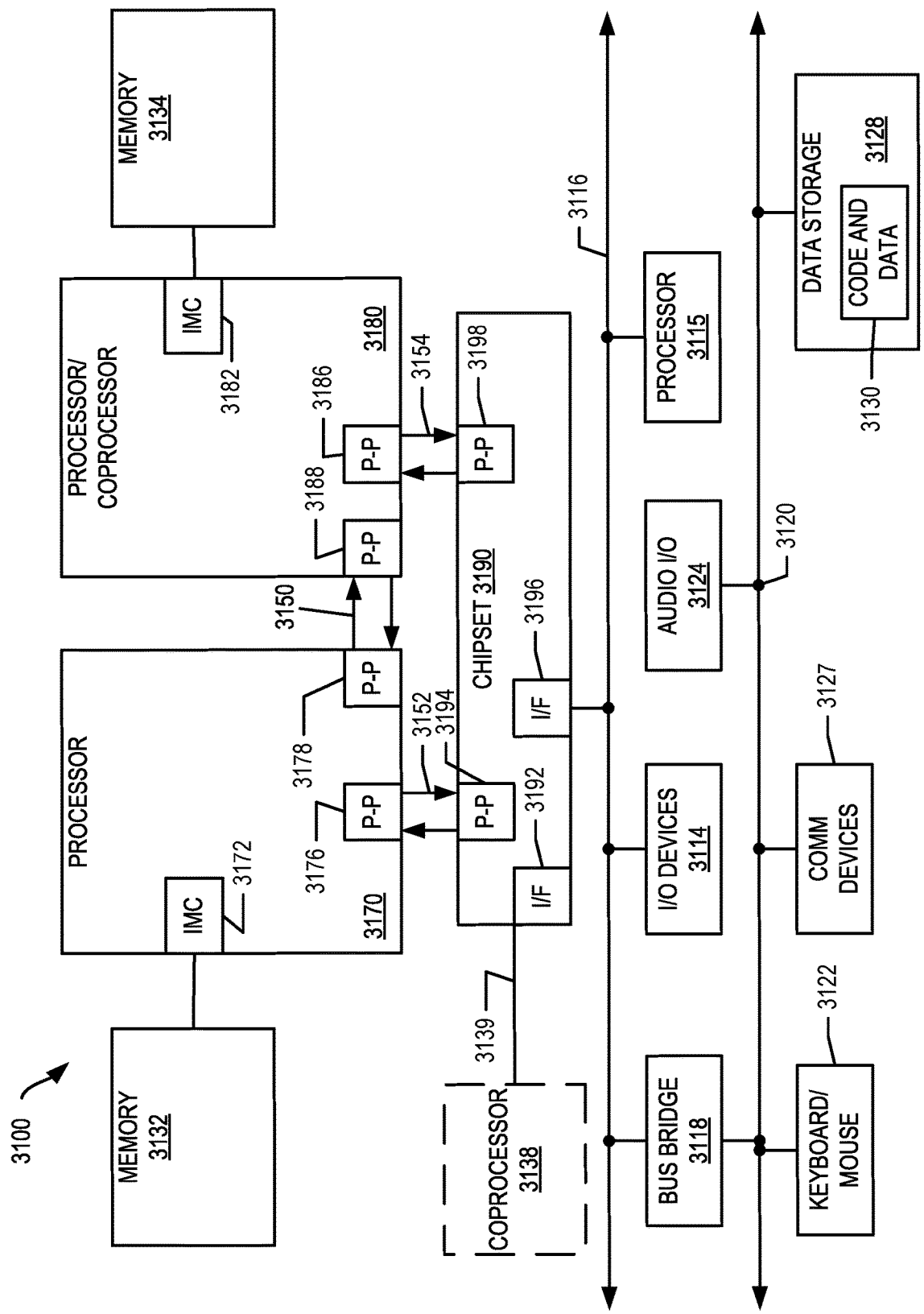
FIG. 31 is a block diagram of a more specific exemplary system in accordance with an embodiment of the present disclosure.

Referring now to FIG. 31, shown is a block diagram of a first more specific exemplary system 3100 in accordance with an embodiment of the present disclosure. As shown in FIG. 31, multiprocessor system 3100 is a point-to-point interconnect system, and includes a first processor 3170 and a second processor 3180 coupled via a point-to-point interconnect 3150. Each of processors 3170 and 3180 may be some version of the processor 2900. In one embodiment of the disclosure, processors 3170 and 3180 are respectively processors 3010 and 3015, while coprocessor 3138 is coprocessor 3045. In another embodiment, processors 3170 and 3180 are respectively processor 3010 coprocessor 3045.

Processors 3170 and 3180 are shown including integrated memory controller (IMC) units 3172 and 3182, respectively. Processor 3170 also includes as part of its bus controller units point-to-point (P-P) interfaces 3176 and 3178; similarly, second processor 3180 includes P-P interfaces 3186 and 3188. Processors 3170, 3180 may exchange information via a point-to-point (P-P) interface 3150 using P-P interface circuits 3178, 3188. As shown in FIG. 31, IMCs 3172 and 3182 couple the processors to respective memories, namely a memory 3132 and a memory 3134, which may be portions of main memory locally attached to the respective processors.

Processors 3170, 3180 may each exchange information with a chipset 3190 via individual P-P interfaces 3152, 3154 using point to point interface circuits 3176, 3194, 3186, 3198. Chipset 3190 may optionally exchange information with the coprocessor 3138 via a high-performance interface 3139. In one embodiment, the coprocessor 3138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3190 may be coupled to a first bus 3116 via an interface 3196. In one embodiment, first bus 3116 may be a Peripheral Component Interconnect (PCI) bus, or a bus such as a PCI Express bus or another third generation I/O interconnect bus, although the scope of the present disclosure is not so limited.

As shown in FIG. 31, various I/O devices 3114 may be coupled to first bus 3116, along with a bus bridge 3118 which couples first bus 3116 to a second bus 3120. In one embodiment, one or more additional processor(s) 3115, such as coprocessors, high-throughput MIC processors, GPGPU's, accelerators (such as, e.g., graphics accelerators or digital signal processing (DSP) units), field programmable gate arrays, or any other processor, are coupled to first bus 3116. In one embodiment, second bus 3120 may be a low pin count (LPC) bus. Various devices may be coupled to a second bus 3120 including, for example, a keyboard and/or mouse 3122, communication devices 3127 and a storage unit 3128 such as a disk drive or other mass storage device which may include instructions/code and data 3130, in one embodiment. Further, an audio I/O 3124 may be coupled to the second bus 3120. Note that other architectures are possible. For example, instead of the point-to-point architecture of FIG. 31, a system may implement a multi-drop bus or other such architecture.

Figure 32:
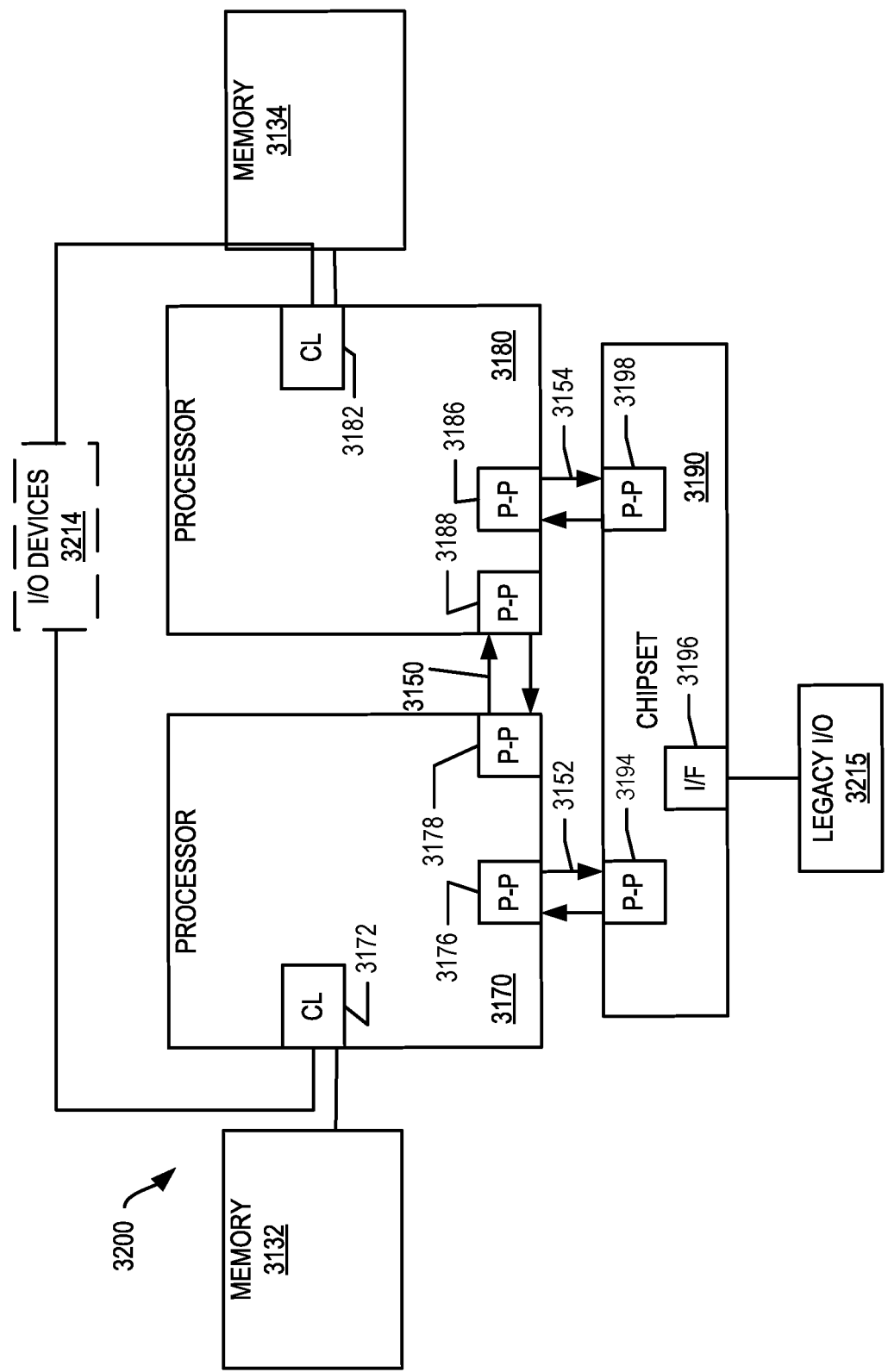
FIG. 32, shown is a block diagram of a second more specific exemplary system in accordance with an embodiment of the present disclosure.

Referring now to FIG. 32, shown is a block diagram of a second more specific exemplary system 3200 in accordance with an embodiment of the present disclosure. Like elements in FIGS. 31 and 32 bear like reference numerals, and certain aspects of FIG. 31 have been omitted from FIG. 32 in order to avoid obscuring other aspects of FIG. 32.

FIG. 32 illustrates that the processors 3170, 3180 may include integrated memory and I/O control logic ("CL") 3172 and 3182, respectively. Thus, the CL 3172, 3182 include integrated memory controller units and include I/O control logic. FIG. 32 illustrates that not only are the memories 3132, 3134 coupled to the CL 3172, 3182, but also that I/O devices 3214 are also coupled to the control logic 3172, 3182. Legacy I/O devices 3215 are coupled to the chipset 3190.

Figure 33:
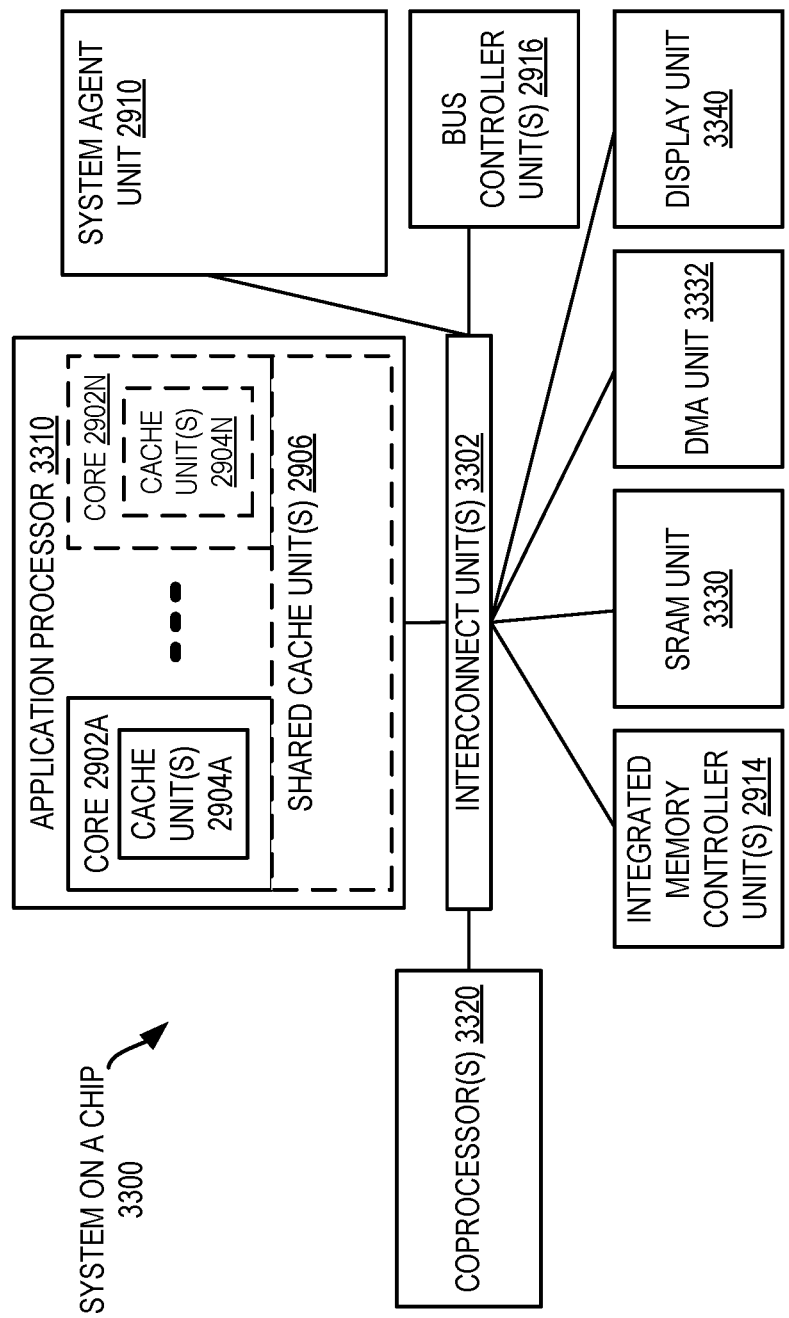
FIG. 33, shown is a block diagram of a system on a chip (SoC) in accordance with an embodiment of the present disclosure.

Referring now to FIG. 33, shown is a block diagram of a SoC 3300 in accordance with an embodiment of the present disclosure. Similar elements in FIG. 29 bear like reference numerals. Also, dashed lined boxes are optional features on more advanced SoCs. In FIG. 33, an interconnect unit(s) 3302 is coupled to: an application processor 3310 which includes a set of one or more cores 202A-N and shared cache unit(s) 2906; a system agent unit 2910; a bus controller unit(s) 2916; an integrated memory controller unit(s) 2914; a set or one or more coprocessors 3320 which may include integrated graphics logic, an image processor, an audio processor, and a video processor; an static random access memory (SRAM) unit 3330; a direct memory access (DMA) unit 3332; and a display unit 3340 for coupling to one or more external displays. In one embodiment, the coprocessor(s) 3320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 3130 illustrated in FIG. 31, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 34:
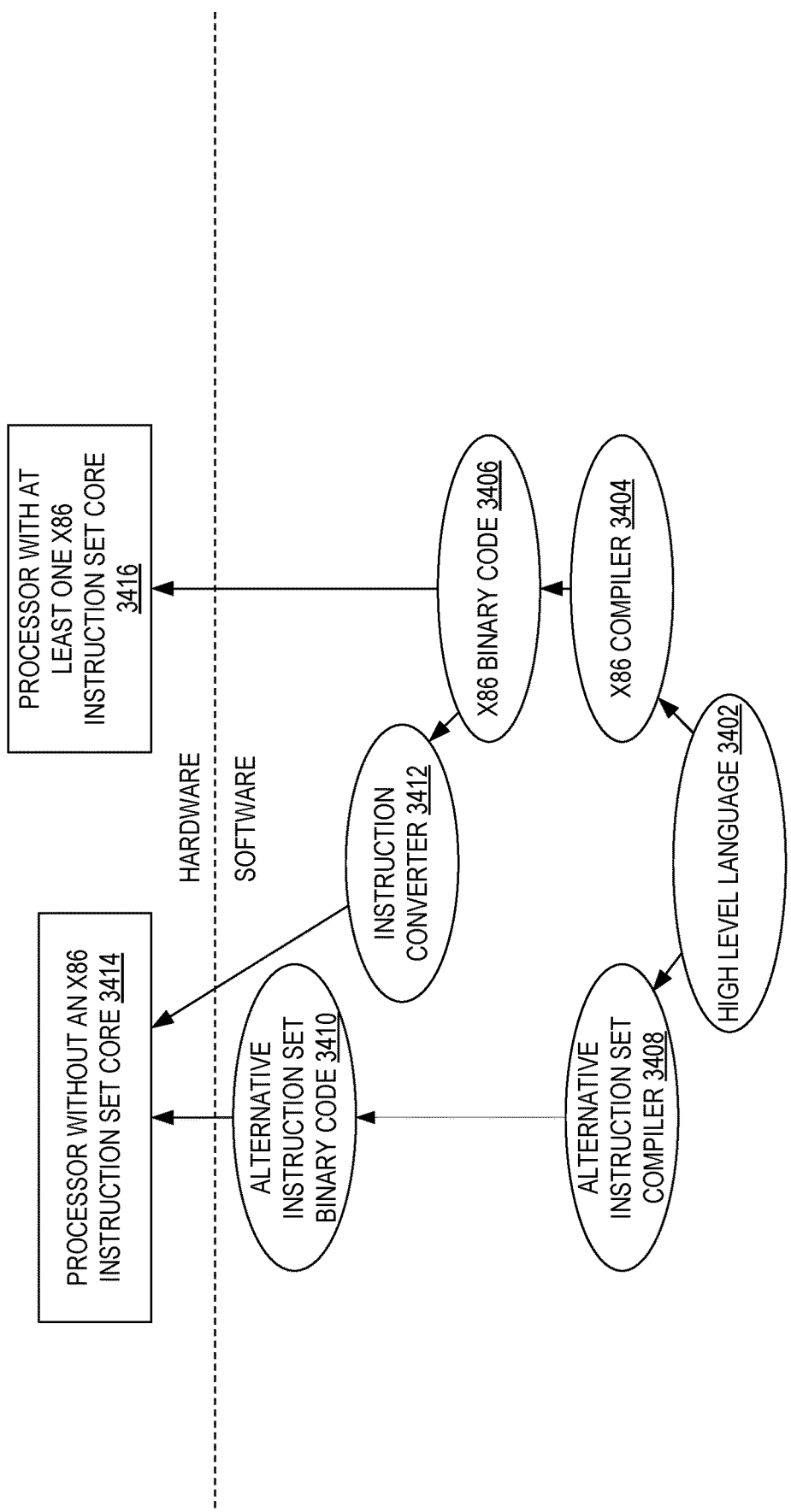
FIG. 34 is a block diagram contrasting the use of a software instruction converter to convert binary instructions in a source instruction set to binary instructions in a target instruction set according to embodiments of the disclosure.

FIG. 34 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 34 shows a program in a high-level language 3402 may be compiled using an x86 compiler 3404 to generate x86 binary code 3406 that may be natively executed by a processor with at least one x86 instruction set core 3416. The processor with at least one x86 instruction set core 3416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 3404 represents a compiler that is operable to generate x86 binary code 3406 (e.g., object code) that can, with or without additional linkage processing, be executed on the processor with at least one x86 instruction set core 3416. Similarly, FIG. 34 shows the program in the high level language 3402 may be compiled using an alternative instruction set compiler 3408 to generate alternative instruction set binary code 3410 that may be natively executed by a processor without at least one x86 instruction set core 3414 (e.g., a processor with cores that execute the MIPS instruction set of MIPS Technologies of Sunnyvale, CA and/or that execute the ARM instruction set of ARM Holdings of Sunnyvale, CA). The instruction converter 3412 is used to convert the x86 binary code 3406 into code that may be natively executed by the processor without an x86 instruction set core 3414. This converted code is not likely to be the same as the alternative instruction set binary code 3410 because an instruction converter capable of this is difficult to make; however, the converted code will accomplish the general operation and be made up of instructions from the alternative instruction set. Thus, the instruction converter 3412 represents software, firmware, hardware, or a combination thereof that, through emulation, simulation, or any other process, allows a processor or other electronic device that does not have an x86 instruction set processor or core to execute the x86 binary code 3406.

What is claimed is:

1. An apparatus comprising:
a plurality of processor cores comprising a first type of processor core that supports a first instruction set architecture and a second type of processor core that supports a second different instruction set architecture;
a decoder circuit of a processor core of the plurality of processor cores to decode a single instruction into a decoded single instruction, the single instruction including a field that identifies a requested core type and an opcode that indicates an execution circuit of the processor core is to:
read a register to determine a core type of the processor core,
cause the processor core to enter a first mode, that only permits execution of the first instruction set architecture by the processor core, when the requested core type and the core type of the processor core are the first type,
cause the processor core to enter a second mode, that only permits execution of the second different instruction set architecture by the processor core, when the requested core type and the core type of the processor core are the second type,
cause the processor core to enter a third mode, that only permits execution of the first instruction set architecture by the processor core, when the requested core type is the second type and the core type of the processor core is the first type, and
cause the processor core to enter a fourth mode, that only permits execution of the second different instruction set architecture by the processor core, when the requested core type is the first type and the core type of the processor core is the second type; and
the execution circuit of the processor core to execute the decoded single instruction according to the opcode.

2. The apparatus of claim 1, wherein the opcode indicates the execution circuit of the processor core is to set a bit in a flag register to a first value when entering the first mode and the second mode, and to a second value when entering the third mode and the fourth mode.

3. The apparatus of claim 1, wherein the second different instruction set architecture is the first instruction set architecture and one or more additional instructions not supported by the first type of processor core.

4. The apparatus of claim 3, wherein, when execution of the processor core is interrupted when in the second mode, the execution is resumed only on another processor core of the plurality of processing cores that is the second type.

5. The apparatus of claim 3, wherein:
the decoder circuit of the processor core is to decode a second single instruction into a decoded second single instruction, the second single instruction including an opcode that indicates the execution circuit of the processor core is to cause the processor core to switch from the second mode to the first mode that only permits execution of the first instruction set architecture by the processor core; and
the execution circuit of the processor core to execute the decoded second single instruction according to the opcode.

6. The apparatus of claim 1, wherein, when execution of the processor core is interrupted when in the modes, the execution is resumed only on another processor core of the plurality of processing cores that is a corresponding type for that mode.

7. The apparatus of claim 1, wherein, when execution of the processor core is context switched when in the modes, the execution is resumed only on another processor core of the plurality of processing cores that is a corresponding type for that mode.

8. The apparatus of claim 1, wherein the opcode indicates the execution circuit of the processor core is to raise an exception to steer execution to another processor core of the plurality of processing cores that is the requested core type when in the third mode or the fourth mode.

9. A method comprising:
decoding, by a decoder circuit of a processor core of a plurality of processor cores comprising a first type of processor core that supports a first instruction set architecture and a second type of processor core that supports a second different instruction set architecture, a single instruction into a decoded single instruction, the single instruction including a field that identifies a requested core type and an opcode that indicates an execution circuit of the processor core is to:
read a register to determine a core type of the processor core,
cause the processor core to enter a first mode, that only permits execution of the first instruction set architecture by the processor core, when the requested core type and the core type of the processor core are the first type,
cause the processor core to enter a second mode, that only permits execution of the second different instruction set architecture by the processor core, when the requested core type and the core type of the processor core are the second type,
cause the processor core to enter a third mode, that only permits execution of the first instruction set architecture by the processor core, when the requested core type is the second type and the core type of the processor core is the first type, and cause the processor core to enter a fourth mode, that only permits execution of the second different instruction set architecture by the processor core, when the requested core type is the first type and the core type of the processor core is the second type; and executing the decoded single instruction by the execution circuit of the processor core according to the opcode.

10. The method of claim 9, wherein the opcode indicates the execution circuit of the processor core is to set a bit in a flag register to a first value when entering the first mode and the second mode, and to a second value when entering the third mode and the fourth mode.

11. The method of claim 9, wherein the second different instruction set architecture is the first instruction set architecture and one or more additional instructions not supported by the first type of processor core.

12. The method of claim 11, wherein, when execution of the processor core is interrupted when in the second mode, the execution is resumed only on another processor core of the plurality of processing cores that is the second type.

13. The method of claim 11, further comprising:
decoding a second single instruction by the decoder circuit of the processor core into a decoded second single instruction, the second single instruction including an opcode that indicates the execution circuit of the processor core is to cause the processor core to switch from the second mode to the first mode that only permits execution of the first instruction set architecture by the processor core; and
executing the decoded second single instruction by the execution circuit of the processor core according to the opcode.

14. The method of claim 9, wherein, when execution of the processor core is interrupted when in the modes, the execution is resumed only on another processor core of the plurality of processing cores that is a corresponding type for that mode.

15. The method of claim 9, wherein, when execution of the processor core is context switched when in the modes, the execution is resumed only on another processor core of the plurality of processing cores that is a corresponding type for that mode.

16. The method of claim 9, wherein the opcode indicates the execution circuit of the processor core is to raise an exception to steer execution to another processor core of the plurality of processing cores that is the requested core type when in the third mode or the fourth mode.

17. A non-transitory machine readable medium that stores program code that when executed by a machine causes the machine to perform a method comprising:
decoding, by a decoder circuit of a processor core of a plurality of processor cores comprising a first type of processor core that supports a first instruction set architecture and a second type of processor core that supports a second different instruction set architecture, a single instruction into a decoded single instruction, the single instruction including a field that identifies a requested core type and an opcode that indicates an execution circuit of the processor core is to:
read a register to determine a core type of the processor core,
cause the processor core to enter a first mode, that only permits execution of the first instruction set architecture by the processor core, when the requested core type and the core type of the processor core are the first type,
cause the processor core to enter a second mode, that only permits execution of the second different instruction set architecture by the processor core, when the requested core type and the core type of the processor core are the second type,
cause the processor core to enter a third mode, that only permits execution of the first instruction set architecture by the processor core, when the requested core type is the second type and the core type of the processor core is the first type, and
cause the processor core to enter a fourth mode, that only permits execution of the second different instruction set architecture by the processor core, when the requested core type is the first type and the core type of the processor core is the second type; and executing the decoded single instruction by the execution circuit of the processor core according to the opcode.

18. The non-transitory machine readable medium of claim 17, wherein the opcode indicates the execution circuit of the processor core is to set a bit in a flag register to a first value when entering the first mode and the second mode, and to a second value when entering the third mode and the fourth mode.

19. The non-transitory machine readable medium of claim 17, wherein the second different instruction set architecture is the first instruction set architecture and one or more additional instructions not supported by the first type of processor core.

20. The non-transitory machine readable medium of claim 19, wherein, when execution of the processor core is interrupted when in the second mode, the execution is resumed only on another processor core of the plurality of processing cores that is the second type.

21. The non-transitory machine readable medium of claim 19, further comprising:
decoding a second single instruction by the decoder circuit of the processor core into a decoded second single instruction, the second single instruction including an opcode that indicates the execution circuit of the processor core is to cause the processor core to switch from the second mode to the first mode that only permits execution of the first instruction set architecture by the processor core; and
executing the decoded second single instruction by the execution circuit of the processor core according to the opcode.

22. The non-transitory machine readable medium of claim 17, wherein, when execution of the processor core is interrupted when in the modes, the execution is resumed only on another processor core of the plurality of processing cores that is a corresponding type for that mode.

23. The non-transitory machine readable medium of claim 17, wherein, when execution of the processor core is context switched when in the modes, the execution is resumed only on another processor core of the plurality of processing cores that is a corresponding type for that mode.

24. The non-transitory machine readable medium of claim 17, wherein the opcode indicates the execution circuit of the processor core is to raise an exception to steer execution to another processor core of the plurality of processing cores that is the requested core type when in the third mode or the fourth mode.

* * * * *